US006618434B2

(12) United States Patent
Heidari-Bateni et al.

(10) Patent No.: US 6,618,434 B2
(45) Date of Patent: Sep. 9, 2003

(54) ADAPTIVE, MULTIMODE RAKE RECEIVER FOR DYNAMIC SEARCH AND MULTIPATH RECEPTION

(75) Inventors: Ghobad Heidari-Bateni, San Diego, CA (US); Robert Thomas Plunkett, Sunnyvale, CA (US)

(73) Assignee: QuickSilver Technology, Inc., San Jose, CA (US)

( * ) Notice: Subject to any disclaimer, the term of this patent is extended or adjusted under 35 U.S.C. 154(b) by 0 days.

(21) Appl. No.: 09/871,049

(22) Filed: May 31, 2001

(65) Prior Publication Data

US 2002/0181559 A1 Dec. 5, 2002

(51) Int. Cl.[7] ............................................... H04B 1/707
(52) U.S. Cl. ....................................... 375/148; 375/150
(58) Field of Search ................................ 375/142–145, 375/147–153

(56) References Cited

U.S. PATENT DOCUMENTS

| 5,490,165 | A | * | 2/1996 | Blakeney et al. ............ 370/335 |
| 5,646,544 | A | * | 7/1997 | Iadanza ........................ 326/38 |
| 5,684,793 | A | * | 11/1997 | Kiema et al. ................ 370/335 |
| 5,737,631 | A | * | 4/1998 | Trimberger .................. 712/37 |
| 5,828,858 | A | * | 10/1998 | Athanas et al. .............. 710/317 |
| 5,892,961 | A | * | 4/1999 | Trimberger .................. 712/10 |
| 5,907,580 | A | * | 5/1999 | Cummings ................... 375/220 |

(List continued on next page.)

FOREIGN PATENT DOCUMENTS

| EP | 0 661 831 A2 | 7/1995 |
| EP | 0 690 588 A2 | 1/1996 |
| EP | 0 691 754 A2 | 1/1996 |
| EP | 0 821 495 A2 | 1/1998 |

OTHER PUBLICATIONS

Fawer U. et al., "A Multiprocessor Approach for Implementing a Time–Diversity Spread Spectrum Receiver", Proceedings of the 1990 International Zurich Seminal on Digital Communications Mar. 5–8, 1990, pp. 173–180.

Kaufmann H. et al., "Digital Spread–Spectrum Multipath–Diversity Receiver for Indoor Communications", From Pioneers to the 21st Century; Denver, May 10–13, 1992, Proceedings of the Vehicular Technology Society Conference, NY, IEEE, US, vol. 2, Conf. 42, pp. 1038–1041.

*Primary Examiner*—Amanda T. Le
(74) *Attorney, Agent, or Firm*—Nancy R. Gamburd

(57) ABSTRACT

The present invention concerns a new type of rake receiver, namely, a multimode rake receiver, which may be included within either a mobile station or a base station, and which has dynamic pilot signal searching and multipath reception and combining capability, for CDMA, cdma2000, W-CDMA, or other mobile communication systems. The adaptive, multimode rake receiver includes a network interface, a plurality of adaptive multimode rake fingers, and a multimode processor. Each adaptive multimode rake finger and the multimode processor are responsive to first configuration information (a first mode signal) to configure for a path reception functional mode and are further responsive to second configuration information (a second mode signal) to configure for a searcher functional mode, providing the multimode rake receiver with acquisition, traffic, and idle modes. In the preferred embodiment, the multimode rake receiver is implemented using a new category of integrated circuitry for adaptive or reconfigurable computing, providing a plurality of heterogeneous computational elements coupled to an interconnection network, to form adaptive and reconfigurable multimode rake fingers and a multimode processor, for a plurality of different functional modes, including pilot signal searching and multipath reception and combination.

50 Claims, 13 Drawing Sheets

U.S. PATENT DOCUMENTS

| | | | | |
|---|---|---|---|---|
| 5,959,881 A | * | 9/1999 | Trimberger et al. | 365/182 |
| 5,966,534 A | * | 10/1999 | Cooke et al. | 717/155 |
| 5,970,254 A | * | 10/1999 | Cooke et al. | 712/37 |
| 6,023,742 A | * | 2/2000 | Ebeling et al. | 710/107 |
| 6,088,043 A | * | 7/2000 | Kelleher et al. | 345/502 |
| 6,094,065 A | * | 7/2000 | Tavana et al. | 326/39 |
| 6,120,551 A | * | 9/2000 | Law et al. | 716/17 |
| 6,150,838 A | * | 11/2000 | Wittig et al. | 326/39 |
| 6,230,307 B1 | * | 5/2001 | Davis et al. | 716/16 |
| 6,237,029 B1 | * | 5/2001 | Master et al. | 709/217 |
| 6,408,039 B1 | * | 6/2002 | Ito | 375/347 |
| 6,459,883 B2 | * | 10/2002 | Subramanian et al. | 455/67.1 |
| 2002/0015435 A1 | * | 2/2002 | Rieken | 375/130 |
| 2002/0159503 A1 | * | 10/2002 | Ramachandran | 375/146 |

* cited by examiner

ADAPTIVE COMPUTING ENGINE (ACE)

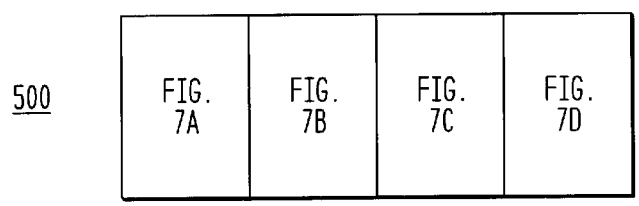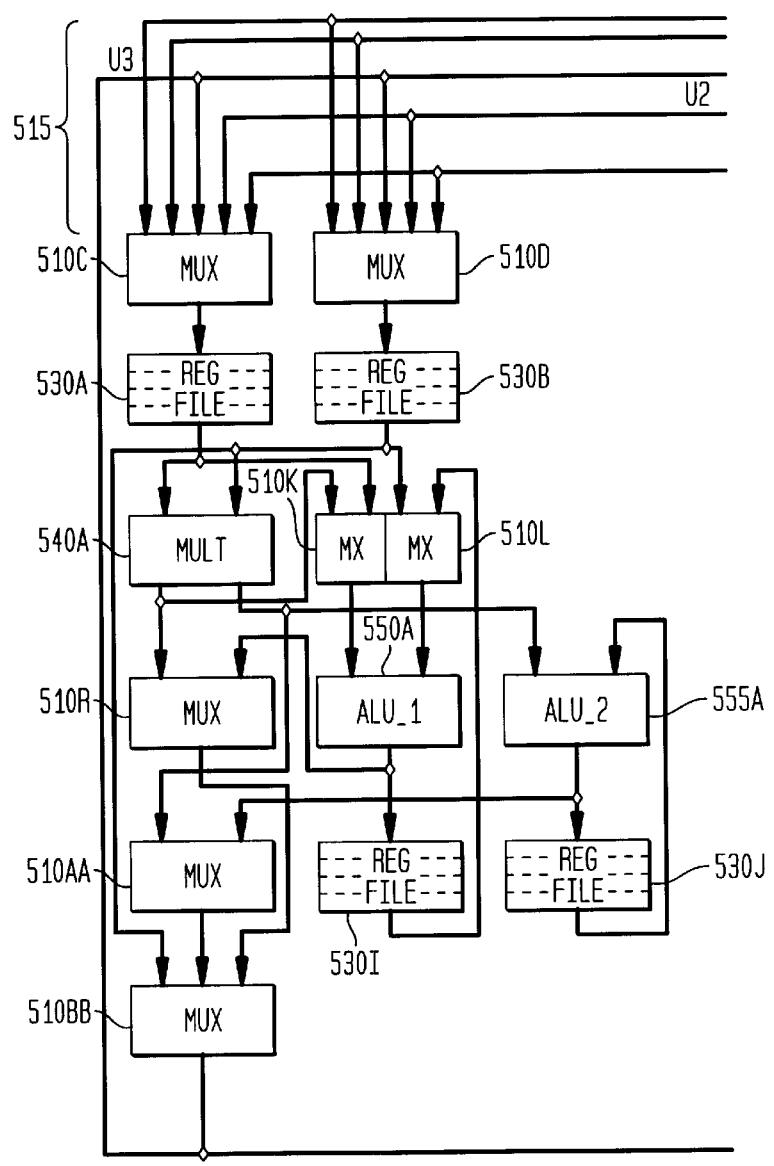

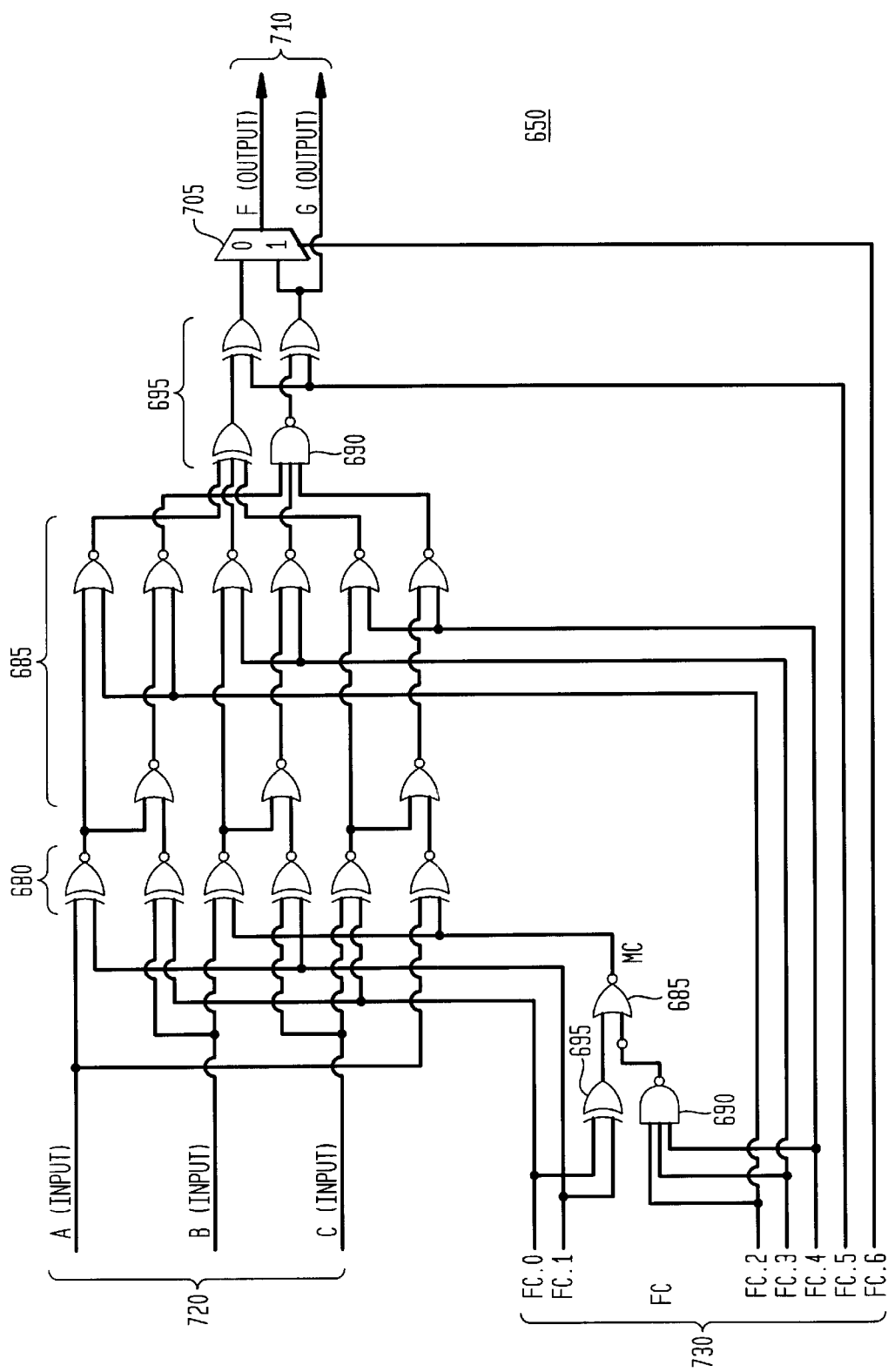

ADAPTIVE, MULTIMODE RAKE RECEIVER FOR DYNAMIC SEARCH AND MULTIPATH RECEPTION

CROSS-REFERENCE TO RELATED APPLICATION

This application is related to Paul L. Master et al., U.S. patent application Ser. No. 09/815,122, entitled "Adaptive Integrated Circuitry With Heterogeneous And Reconfigurable Matrices Of Diverse And Adaptive Computational Units Having Fixed, Application Specific Computational Elements", filed Mar. 22, 2001 and commonly assigned to QuickSilver Technology, Inc., and incorporated by reference herein, with priority claimed for all commonly disclosed subject matter (the "related application").

FIELD OF THE INVENTION

The present invention relates, in general, to integrated circuits and, more particularly, to adaptive and reconfigurable integrated circuitry for multimode rake reception for dynamic search and multipath reception, utilized, for example, in CDMA, cdma2000, W-CDMA, or any other direct-sequence spread spectrum communication systems.

BACKGROUND OF THE INVENTION

Code Division Multiple Access ("CDMA"), cdma2000, and wideband-CDMA ("W-CDMAD") mobile communication systems are increasingly deployed (or planned to be deployed) to accommodate increasing usage levels of mobile communication technologies. Within these communication systems, and more particularly within base stations and mobile stations (or mobile units, such as CDMA mobile telephones or multimedia devices), a "rake" receiver is employed for multipath reception, to add both spatial diversity and time diversity to the communication system.

A rake receiver includes a plurality of "rake fingers", which are used for this multipath reception, and a designated searcher (with various searching windows). Such a searcher is employed to determine the available multipaths, to which the rake fingers are then assigned. In addition, within mobile stations, the searcher is also employed for system (pilot signal) acquisition, potential soft hand-off functions, and in general, to monitor a plurality of pilot signals or channels transmitted from a corresponding plurality of base stations, for ongoing, continuous selection of a currently strongest transmitted signal from a base station.

Current CDMA implementations of rake receivers employ a fixed number of rake fingers in mobile stations and in base stations. In mobile stations, typically three rake fingers are used to receive up to three multipaths, and one searcher is used to monitor the available or upcoming multipaths and base station signals, for example. Such a fixed number of fingers or searcher, each dedicated for either multipath reception or searching, respectively, may result in unacceptable delays (such as delays in system acquisition), dropped calls, degraded calls, or other poor system performance.

In addition, implementations of proposed technologies such as cdma2000 and W-CDMA may require or may be optimized with use of additional rake fingers in traffic mode for multipath reception and additional searchers for searching signal or channel selection, each with additional complexity to accommodate larger spreading (pseudorandom noise or "PN") codes or sequences and orthogonal functions. Such use of additional, fixed and dedicated integrated circuit ("IC") hardware, however, may increase the complexity and cost of the rake receiver, and may increase power consumption, with potential detrimental effects on battery life and corresponding talk or traffic time.

As a consequence, a need remains to provide an adaptive and reconfigurable rake receiver, which may be dynamically optimized in real time for multimode functionality, for both multipath reception and searching functions. Such an adaptive and reconfigurable rake receiver should also minimize power consumption and should be suitable for low power applications, such as for use in hand-held and other battery-powered devices.

SUMMARY OF THE INVENTION

The present invention concerns a new type of rake receiver, namely, a multimode rake receiver, which may be included within either a mobile station or a base station, and which has dynamic pilot signal searching and multipath reception and combining capability, for CDMA, PCS, 3G or other mobile communication systems. The multimode rake receiver of the present invention may be implemented utilizing existing forms of integrated circuitry, or preferably implemented utilizing a new category of integrated circuitry and a new methodology for adaptive or reconfigurable computing.

In addition, the preferred multimode rake receiver of the present invention provides multiple modes of operation, a system acquisition mode, a traffic mode, and an idle mode. The present invention recognizes that in certain modes of operation, system acquisition more and idle mode, there is typically no need for more than one rake finger (zero in system acquisition, and one in idle mode), and any additional rake fingers in these modes would be a waste of IC material. Instead, in accordance with the invention, multiple searchers would be useful in these modes to increase system acquisition speed or neighbor searches. Also, in traffic mode, the exact number of multipaths or base station signals to receive is dynamically variable due to fading channels. Hence, the present invention provides the capability to dynamically swap rake fingers with searchers in order to enhance the performance of the receiver, depending on the current state of the radio frequency (RF) environment.

The preferred IC embodiment includes a plurality of heterogeneous computational elements coupled to an interconnection network, forming multimode rake fingers. The plurality of heterogeneous computational elements include corresponding computational elements having fixed and differing architectures, such as fixed architectures for different functions such as memory, addition, multiplication, complex multiplication, subtraction, configuration, reconfiguration, control, input, output, and field programmability. In response to configuration information, the interconnection network is operative in real-time to configure and reconfigure the plurality of heterogeneous computational elements for a plurality of different functional modes, including pilot signal searching and multipath reception and combination.

More particularly, the preferred apparatus includes a network interface, a plurality of adaptive multimode rake fingers, and a multimode processor. Each adaptive multimode rake finger of the plurality of adaptive multimode rake fingers is responsive to first configuration information (a first or path mode signal) to configure for a path reception functional mode and is further responsive to second configuration information (a second or search mode signal) to configure for a searcher functional mode. The multimode processor is also responsive to the first configuration information (the first or path mode signal) to configure for the path reception functional mode and is further responsive to the second configuration information (the second or search mode signal) to configure for the searcher functional mode.

In accordance with the present invention, when the multimode rake receiver is in a system acquisition mode, all adaptive multimode rake fingers and the multimode processor are configured for the searcher functional mode. In a traffic mode, subsets of the adaptive multimode rake fingers and the multimode processor are configured for the searcher functional mode or for the path reception mode, dynamically, depending upon factors such as pilot signal strength and the number of available multipaths. In an idle mode, subsets of the adaptive multimode rake fingers and the multimode processor may also be configured for a power savings mode.

The present invention preferably utilizes a new form or type of integrated circuitry which effectively and efficiently combines and maximizes the various advantages of processors, application specific integrated circuits ("ASICs"), and field programmable gate arrays ("FPGAs"), while minimizing potential disadvantages. In accordance with the present invention, such a new form or type of integrated circuit, referred to as an adaptive computing engine (ACE), is disclosed which provides the programming flexibility of a processor, the post-fabrication flexibility of FPGAs, and the high speed and high utilization factors of an ASIC. The ACE integrated circuitry of the present invention is readily reconfigurable, in real-time, is capable of having corresponding, multiple modes of operation, and further minimizes power consumption while increasing performance, with particular suitability for low power applications, such as for use in hand-held and other battery-powered devices.

The ACE architecture of the present invention, for adaptive or reconfigurable computing, includes a plurality of heterogeneous computational elements coupled to an interconnection network, rather than the homogeneous units of FPGAs. The plurality of heterogeneous computational elements include corresponding computational elements having fixed and differing architectures, such as fixed architectures for different functions such as memory, addition, multiplication, complex multiplication, subtraction, configuration, reconfiguration, control, input, output, and field programmability. In response to configuration information, the interconnection network is operative in real-time to configure and reconfigure the plurality of heterogeneous computational elements for a plurality of different functional modes, including linear algorithmic operations, non-linear algorithmic operations, finite state machine operations, memory operations, and bit-level manipulations.

As illustrated and discussed in greater detail below, the ACE architecture provides a single IC, which may be configured and reconfigured in real-time, using these fixed and application specific computation elements, to perform a wide variety of tasks. In the preferred embodiment, the ACE architecture forms a plurality of adaptive rake fingers, utilizing elements such as correlators, phase estimators, and phase correctors, which may be dynamically configured and reconfigured for multipath reception and for searching (of both base station signals and available multipaths thereof).

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 10 is a block diagram illustrating, in greater detail, a preferred fixed computational element of a core cell of an adaptive logic processor computational unit, in accordance with the present invention.

DETAILED DESCRIPTION OF THE INVENTION

Figure 1:
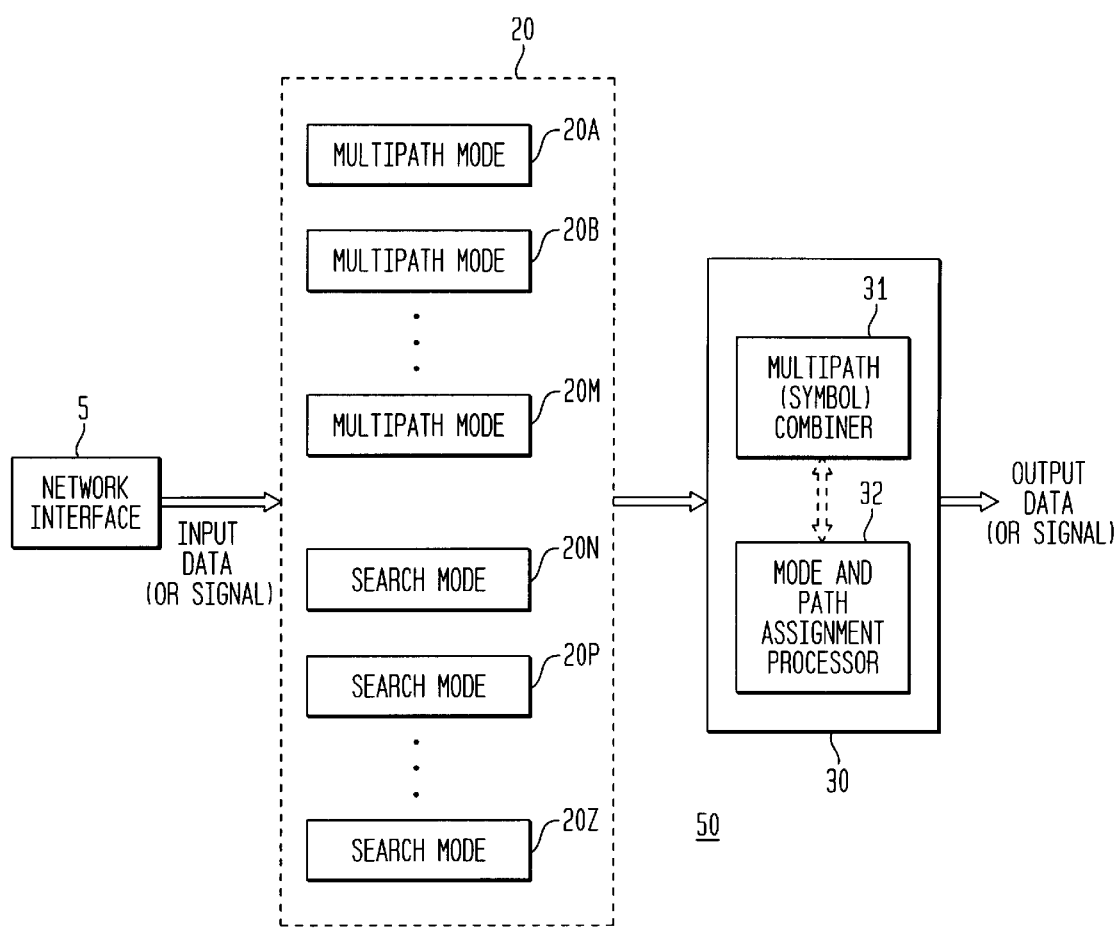
FIG. 1 is a block diagram illustrating a preferred adaptive and reconfigurable multimode rake receiver, for dynamic search and multipath reception, in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As indicated above, a need remains for an adaptive and reconfigurable rake receiver, which may be dynamically optimized in real time for multimode functionality, for both multipath reception and searching functions. Such an adaptive and reconfigurable rake receiver is provided in accordance with the present invention, which utilizes a new form of integrated circuitry, referred to as an adaptive computing engine ("ACE"). The present invention utilizes a plurality of fixed computational elements which may be configured and reconfigured in real time to form the functional blocks (computational units and matrices) which may be needed, at any given time, for searching or multipath reception functions, such as correlators, multipliers, demodulators, and combiners. Such an adaptive and reconfigurable rake receiver, in accordance with the present invention, also minimizes power consumption and is especially suitable for low power applications, such as for use in hand-held and other battery-powered devices.

Figure 2:
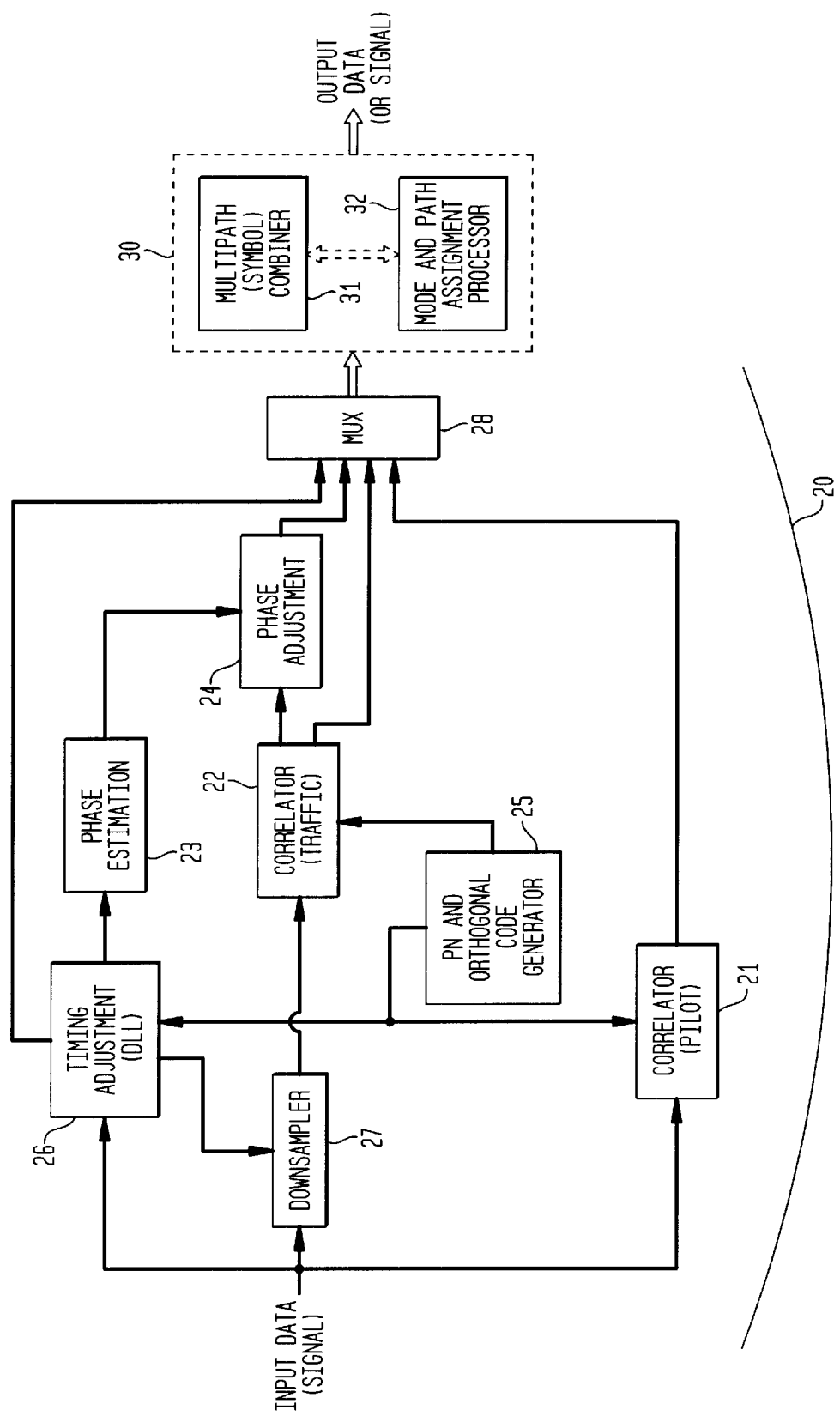
FIG. 2 is a block diagram illustrating an adaptive and reconfigurable multimode rake finger, for dynamic search and multipath reception, in accordance with the present invention.

FIG. 1 is a block diagram illustrating a preferred adaptive and reconfigurable multimode rake receiver 50, for dynamic search and multipath reception, in accordance with the present invention. As mentioned above, such a multimode rake receiver 50 is preferably implemented as one or more matrices 150 (with corresponding interconnection networks) of an ACE apparatus 100, as discussed in detail below with reference to FIGS. 4–10. The adaptive, multimode rake receiver 50 of the present invention may also be implemented as illustrated in FIG. 2, discussed in greater detail below. The multimode rake receiver 50, in accordance with the present invention, may be included within any communication system or apparatus requiring multipath reception and searching functionality, such as within base stations and mobile stations of CDMA, cdma2000, and W-CDMA mobile communication systems or other wireless communication systems.

Referring to FIG. 1, the adaptive, multimode rake receiver 50 includes a plurality of multimode rake fingers 20 operably coupled to a network interface 5, and a multimode processing unit 30. The network interface 5 is typically operably connected to an antenna (not separately illustrated in FIG. 1), and includes functions such as analog-to-digital (A/D) conversion, filtering, and other intermediate frequency processing, providing a baseband, digital input signal to the adaptive multimode rake fingers 20. The multimode processing unit 30 includes functional blocks for multipath (symbol) combining (31) (producing an output signal for de-interleaving and channel decoding) and finger and mode assignment processing (32) (producing finger path assignment signals and mode configuration signals (information)) (to direct rake finger configuration for either path reception or search functional modes, discussed below). (For ease of explanation, other components which may otherwise be included in a conventional or known rake receiver are not separately illustrated in FIG. 1.)

Also not separately illustrated in FIG. 1, but as discussed in greater detail below with reference to FIGS. 4–10, each multimode rake finger 20 generally includes a plurality of computational units 200, which further include a plurality of fixed computational elements 250. These fixed computational elements 250 may be adaptively configured and reconfigured, in real time, to form computational units 200 having either path reception or searcher functionality, including despreading (multiplication with a selected psuedo-noise (psuedorandom noise or "PN") and/or orthogonal codes or sequences), correlation, phase tracking (estimation), and phase adjustment (illustrated in FIG. 2). Similarly, the multimode processing unit 30 is also comprised of fixed computational elements 250 which may be configured and reconfigured into computational units 200. As a consequence, the multimode processing unit 30 is also configured or reconfigured for comparative or relative emphasis on path reception or searcher functionality, namely, as a multipath combiner 31 or as a mode and path assignment processor 32, as illustrated in FIGS. 1 and 2. In addition, these various computational elements 250 may be configured and reconfigured for entirely different functions, as discussed in greater detail below.

As indicated above, each of the multimode rake fingers 20 preferably has at least two operating or functional modes, namely, a path reception mode, illustrated by multimode rake fingers 20A, 20B through 20M, and a search mode, illustrated by multimode rake fingers 20N, 20P through 20Z.

As discussed in greater detail below, depending upon whether the multimode rake receiver 50 is in an acquisition mode, an idle mode, or a traffic mode, each multimode rake finger 20 (of the plurality of multimode rake fingers 20) may be configured or reconfigured for a particular rake receiver functional mode (a path (or multipath) reception mode or a search mode), may be maintained in an idle or unused mode, or may be utilized for another functionality altogether (i.e., used for a different function within the ACE 100). In addition, in the preferred embodiment, one adaptive rake finger (20Z) is continually maintained in a searcher mode (when the ACE 100 (FIG. 4) is utilized for corresponding communication functions). Correspondingly, depending upon whether the multimode rake receiver 50 is in an acquisition mode, an idle mode, or a traffic mode, the multimode processing unit 30 will also have corresponding configurations or reconfigurations, with computational elements 250 configured or reconfigured for comparative or relative emphasis on path reception or searcher functionality, i.e., as a multipath combiner 31 or as a mode and path assignment processor 32. As a consequence, once the multimode processing unit 30 and the multimode rake fingers 20 are configured for path reception and searching functions, the multimode rake receiver 50 may operate as known in the art, i.e., providing despreading, correlation, phase adjustment, multipath combining, multipath detection, and pilot signal searching.

For example, it may be supposed that a particular multimode rake receiver 50 implementation includes a plurality of computational elements 250 sufficient to form up to seven multimode rake fingers 20, and a plurality of computational elements 250 sufficient to accommodate corresponding processing in the multimode processing unit 30. When the multimode rake receiver 50 is in acquisition mode, such as when it has just powered on in a particular location and is trying to find a service provider, in accordance with the present invention, all of the available multimode rake fingers 20 are then configured in the search mode, examining all of the available PN codes at all available frequencies, to find a suitable base station having sufficient pilot signal strength. Correspondingly, for acquisition mode, the computational elements 250 of the multimode processing unit 30 are also configured solely for a searching mode, such as providing computational and memory resources for appropriate PN search windows to locate and prioritize available base stations, without providing additional capability for demodulation or multipath combining. As a consequence, in comparison with prior art implementations in which dedicated hardware is utilized to form one searcher within a mobile station, with a potentially unacceptable acquisition time, the multimode rake receiver 50 in acquisition mode, in accordance with the present invention, may proceed much more rapidly, approximately seven times as fast for the implementation mentioned above, providing system acquisition within a shorter time frame, and with greater reliability.

Conversely, following acquisition, the multimode rake receiver 50 may enter a traffic mode, in which the user may be involved, for example, in full-duplex voice or data transmission. Depending upon environmental and other conditions, the transmission may be subject to considerable fading or may have many dynamically changing multipaths. Depending upon these conditions, the computational elements 250 may be allocated, through configuration and reconfiguration, to provide appropriate levels of multipath reception or pilot searching. For example, under conditions of significant fading but few available multipaths, or under other hand-off conditions, multimode rake receiver 50 resources may be allocated to provide more significant searching, windowing and pilot signal tracking capability, resulting in fewer dropped or degraded calls. Also for example, under conditions with many available multipaths, multimode rake receiver 50 resources may be allocated to provide more significant path reception capability (i.e., a comparatively greater number of multimode rake fingers 20 configured for path reception mode and a comparatively greater allocation of resources of the multimode processing unit 30 configured for multipath combining (31)), resulting in higher quality reception and improved system performance.

FIG. 2 is a block diagram illustrating, in greater detail, an adaptive and reconfigurable multimode rake finger 20, for dynamic search and multipath reception, in accordance with the present invention. As illustrated in FIG. 2, an adaptive, multimode rake finger 20 includes a plurality of correlators, such as a pilot correlator 21 for pilot signal(s) transmitted from one (or more) base stations, a channel (or traffic) correlator 22 for channel (Walsh or orthogonal code or sequence) determination and selection, and correlators (generally 2–3) included within timing adjustment block 26. The multimode rake finger 20 also includes a downsampler 27, a pseudorandom noise (PN) sequence and orthogonal (Walsh) code or sequence generator 25, and other functional blocks for phase estimation or tracking (23) and phase adjustment or correction (24). Timing adjustment block 26 preferably is implemented as a delay lock loop ("DLL"), which fine-tunes the sampling time within a chip period, using a sampling rate of eight-times (8×) the chip rate, for input into downsampling block (27), for use in providing sampled data input into correlator 22. The timing adjustment block 26 also preferably performs on-time (or real-time) de-spreading of the pilot channel, and the de-spread pilot symbols are then input into the phase estimation block 23. (In addition, also for ease of explanation, there may be other components which are not separately illustrated in FIG. 2). In accordance with the present invention, the adaptive, multimode rake finger 20 may also include a multiplexer (or other switch) 28, illustrative of comparatively high-level (or conceptual) configuration capability for configuration of the multimode rake finger 20 for path reception mode or for search mode. For example, and as discussed in greater detail below, the mode and path assignment processor 32 may configure an adaptive rake finger 20 for path reception mode, by transmitting a first (or path) mode signal to its corresponding multiplexer 28, and the mode and path assignment processor 32 may configure another adaptive rake finger 20 for search mode, by transmitting a second (or search) mode signal to its corresponding multiplexer 28, thereby directing an output of the correlator 21, correlator 22, and/or the output of the correlators of timing adjustment block 26 to the mode and path assignment processor 32 (search mode), or directing an output of the phase adjuster 24 to the multipath combiner 31 (path reception mode). More detailed and fine-grained adaptation and reconfiguration capability of a multimode rake finger 20 is illustrated and discussed below with reference to FIGS. 4–10.

Figure 3:
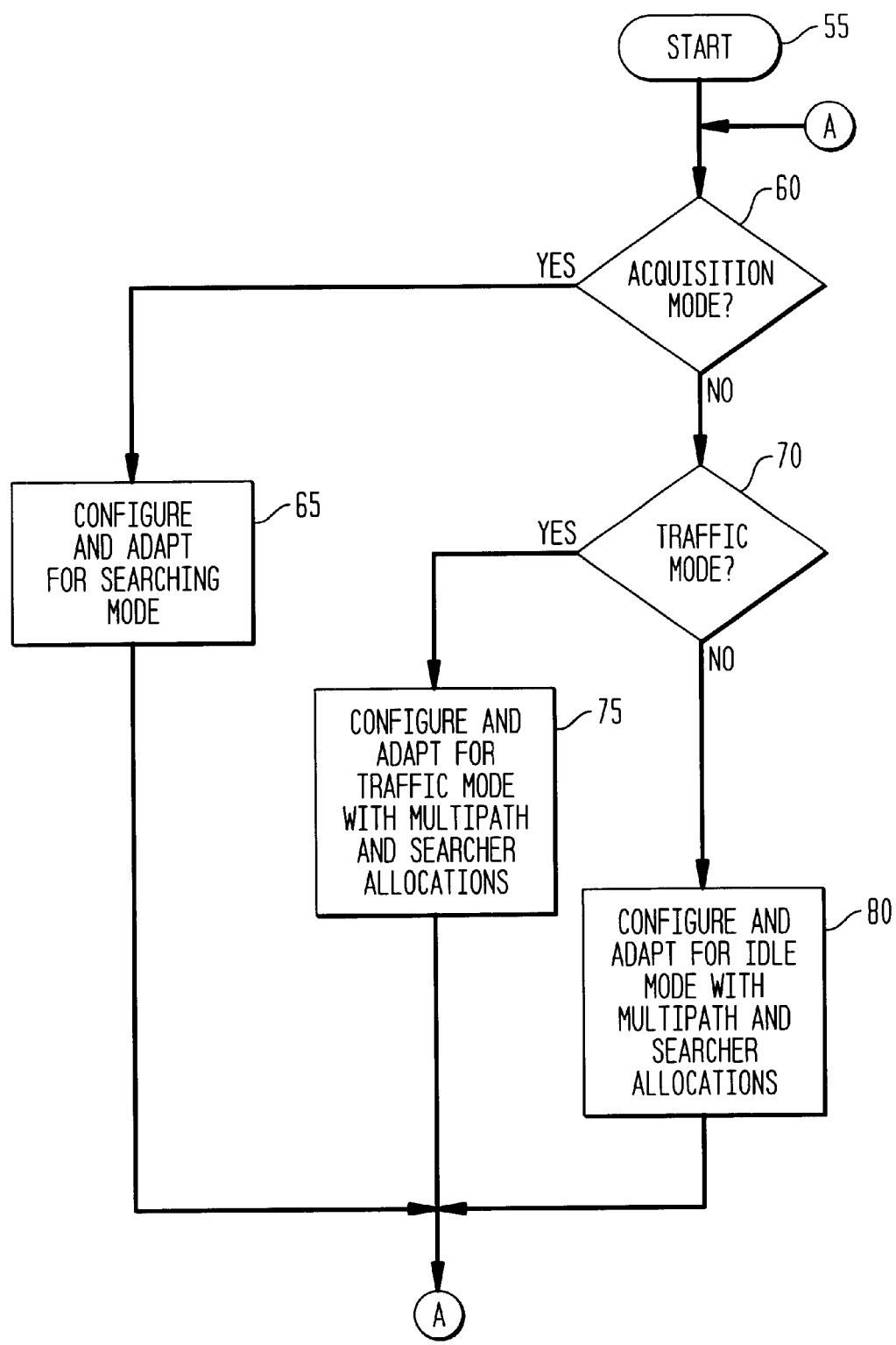
FIG. 3 is a flow diagram illustrating a method for preferred adaptive and reconfigurable multimode rake reception, for dynamic search and multipath reception, in accordance with the present invention.

FIG. 3 is a high-level flow diagram illustrating a method for preferred adaptive and reconfigurable multimode rake reception, for dynamic search and multipath reception, in accordance with the present invention. The method begins, start step 55, with a determination of whether the multimode rake receiver 50 is in acquisition mode, step 60. When the multimode rake receiver 50 is in acquisition mode, the method proceeds to step 65, and configures and adapts the multimode rake receiver 50 for pilot signal searching. As discussed above, for the preferred embodiment in acquisition mode, all of the multimode rake fingers 20 and all resources of the multimode processing unit 30 are configured for search mode, to minimize pilot signal (or system) acquisition time and/or increase acquisition reliability.

When the multimode rake receiver 50 is not in acquisition mode in step 60, the method proceeds to step 70 and determines whether it is in traffic mode. When the multimode rake receiver 50 is in traffic mode, the method proceeds to step 75, and dynamically configures and adapts the multimode rake receiver 50 for the traffic mode, configuring and allocating resources for both multipath reception and pilot signal searching. As mentioned above, depending upon environmental and other conditions, relatively more or fewer resources may be allocated between searching and multipath reception functions. In general, the number of adaptive multimode rake fingers configured for the searcher functional mode and the number of adaptive multimode rake fingers configured for path reception functional mode are dynamically determined based upon one or more of a plurality of channel-dependent parameters, including without limitation a pilot signal relative power level, a number of identified multipaths, a number of identified base stations, received traffic signal-to-noise ratio, and received traffic error rate.

For example, for an impending hand-off, comparatively more multimode rake fingers 20 (and corresponding multimode processing unit 30 resources) may be configured for searching, and following such a hand-off, comparatively more multimode rake fingers 20 (and corresponding multimode processing unit 30 resources) may be configured for multipath reception and combining. Also for example, when few multipaths are available, a correspondingly smaller allocation of multimode rake fingers 20 (and corresponding multimode processing unit 30 resources) may be configured for multipath reception and combining, with comparatively more resources remaining for configuration for searching, and vice-versa. Those of skill in the art will recognize that numerous algorithms and other allocation methods are known and available to provide such system allocation under various fading, multipath and other environmental conditions.

Continuing to refer to FIG. 3, when the multimode rake receiver 50 is not in acquisition mode in step 60, and is not in traffic mode in step 70, the method proceeds to step 80, and dynamically configures and adapts the multimode rake receiver 50 for the idle mode, configuring and allocating resources primarily for intermittent pilot signal searching and intermittent checking for received pages (path reception). In addition, resources may be allocated for a power saving mode, with some of the adaptive rake finger 20 and multimode processor 30 resources configured for a sleep, low power, or powered-off mode. Following steps 65, 75 or 80, the method returns to step 60, for repeated iterations of the method for adaptive and reconfigurable multimode rake reception, in accordance with the present invention.

The adaptive and reconfigurable multimode rake receiver 50, for dynamic search and multipath reception, in accordance with the present invention, provides numerous advantages. First and foremost, for existing CDMA or PCS systems, the dynamic allocation of limited resources between multipath reception and searching functionality provides several types of improved system performance, such as higher quality transmissions due to improved multipath reception, and fewer dropped or degraded calls due to increased and improved searching capability. In addition, next generation systems, such as cdma2000 or W-CDMA, may require an increased number of rake fingers for multipath reception, while simultaneously increasing spreading code lengths, resulting in additional searching and correlation requirements. The dynamic allocation of limited resources between multipath reception and searching functionality, in accordance with the present invention, is especially useful and timely, providing a cost-effective and power saving solution to address the requirements for increased performance and processing capability.

It should be noted that the adaptive, multimode rake receiver 50 of the present invention is not limited to configuration and reconfiguration of dedicated rake finger resources. Rather, the present invention extends to reconfiguring and allocating other, additional resources which may be currently available on an integrated circuit, on a dynamic basis, to solve the current problem at hand. More particularly, the set of overall resources which may be utilized for multipath reception and/or searching may be dynamically expanded or contracted over time based upon which resources are available at that time and based upon the priority of the problem to be solved. For example, when initially powered on, a mobile station may only be engaged in system acquisition, possibly involving only twenty percent of its IC resources. For the preferred ACE embodiment discussed below, in accordance with the present invention, the remaining resources (e.g., eighty percent of the ICs) which are typically involved in non-rake functions may be temporarily allocated and configured for searching functionality, followed by reconfiguration for other, subsequent functions.

Figure 4:
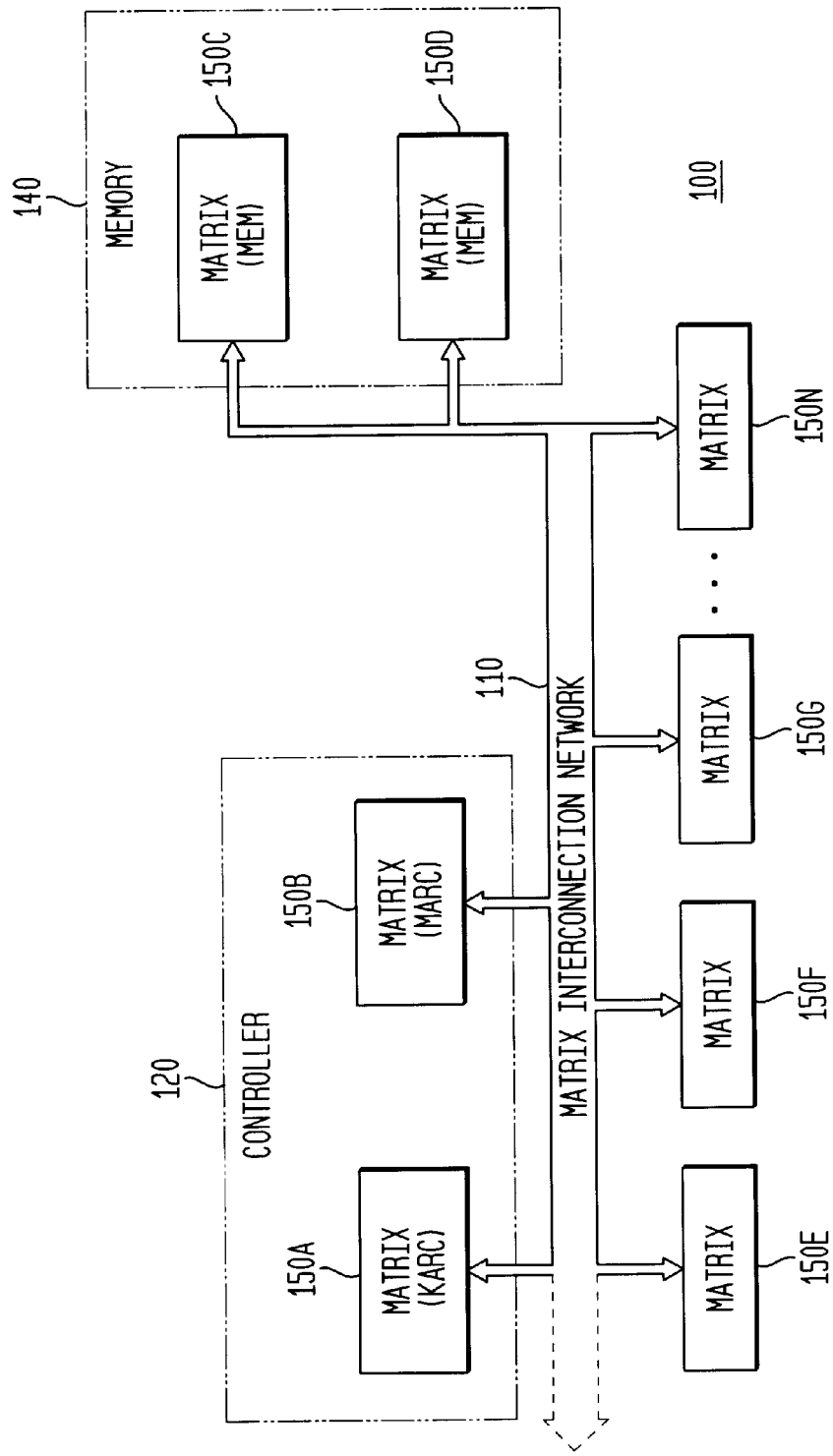
FIG. 4 is a block diagram illustrating a preferred adaptive computing engine (ACE) embodiment in accordance with the present invention.

FIG. 4 is a block diagram illustrating a preferred apparatus 100 embodiment in accordance with the present invention. The apparatus 100, referred to herein as an adaptive computing engine ("ACE") 100, is preferably embodied as an integrated circuit, or as a portion of an integrated circuit having other, additional components. (The ACE 100 is also described in detail in the related application.) In the preferred embodiment, and as discussed in greater detail below, the ACE 100 includes one or more reconfigurable matrices (or nodes) 150, such as matrices 150A through 150N as illustrated, and a matrix interconnection network 110. Also in the preferred embodiment, and as discussed in detail below, one or more of the matrices 150, such as matrices 150A and 150B, are configured for functionality as a controller 120, while other matrices, such as matrices 150C and 150D, are configured for functionality as a memory 140. The various matrices 150 and matrix interconnection network 110 may also be implemented together as fractal subunits, which may be scaled from a few nodes to thousands of nodes. As mentioned above, in the preferred embodiment, the multimode rake receiver 50 of the present invention is embodied as an ACE 100 or as one or more matrices 150 (with corresponding interconnection networks).

A significant departure from the prior art, the ACE 100 does not utilize traditional (and typically separate) data, direct memory access ("DMA"), random access, configuration and instruction busses for signaling and other transmission between and among the reconfigurable matrices 150, the controller 120, and the memory 140, or for other input/output ("I/O") functionality. Rather, data, control and configuration information are transmitted between and among these matrix 150 elements, utilizing the matrix interconnection network 110, which may be configured and reconfigured, in real-time, to provide any given connection between and among the reconfigurable matrices 150, including those matrices 150 configured as the controller 120 and the memory 140, as discussed in greater detail below.

The matrices 150 configured to function as memory 140 may be implemented in any desired or preferred way, utilizing computational elements (discussed below) of fixed memory elements, and may be included within the ACE 100 or incorporated within another IC or portion of an IC. In the preferred embodiment, the memory 140 is included within the ACE 100, and preferably is comprised of computational elements which are low power consumption random access memory (RAM), but also may be comprised of computational elements of any other form of memory, such as flash, DRAM, SRAM, MRAM, ROM, EPROM or $E^2$PROM. In the preferred embodiment, the memory 140 preferably includes DMA engines, not separately illustrated.

The controller 120 is preferably implemented, using matrices 150A and 150B configured as adaptive finite state machines, as a reduced instruction set ("RISC") processor, controller or other device or IC capable of performing the two types of functionality discussed below. (Alternatively, these functions may be implemented utilizing a conventional RISC or other processor.) The first control functionality, referred to as "kernel" control, is illustrated as kernel controller ("KARC") of matrix 150A, and the second control functionality, referred to as "matrix" control, is illustrated as matrix controller ("MARC") of matrix 150B. The kernel and matrix control functions of the controller 120 are explained in greater detail below, with reference to the configurability and reconfigurability of the various matrices 150, and with reference to the preferred form of combined data, configuration and control information referred to herein as a "silverware" module.

Figure 5:
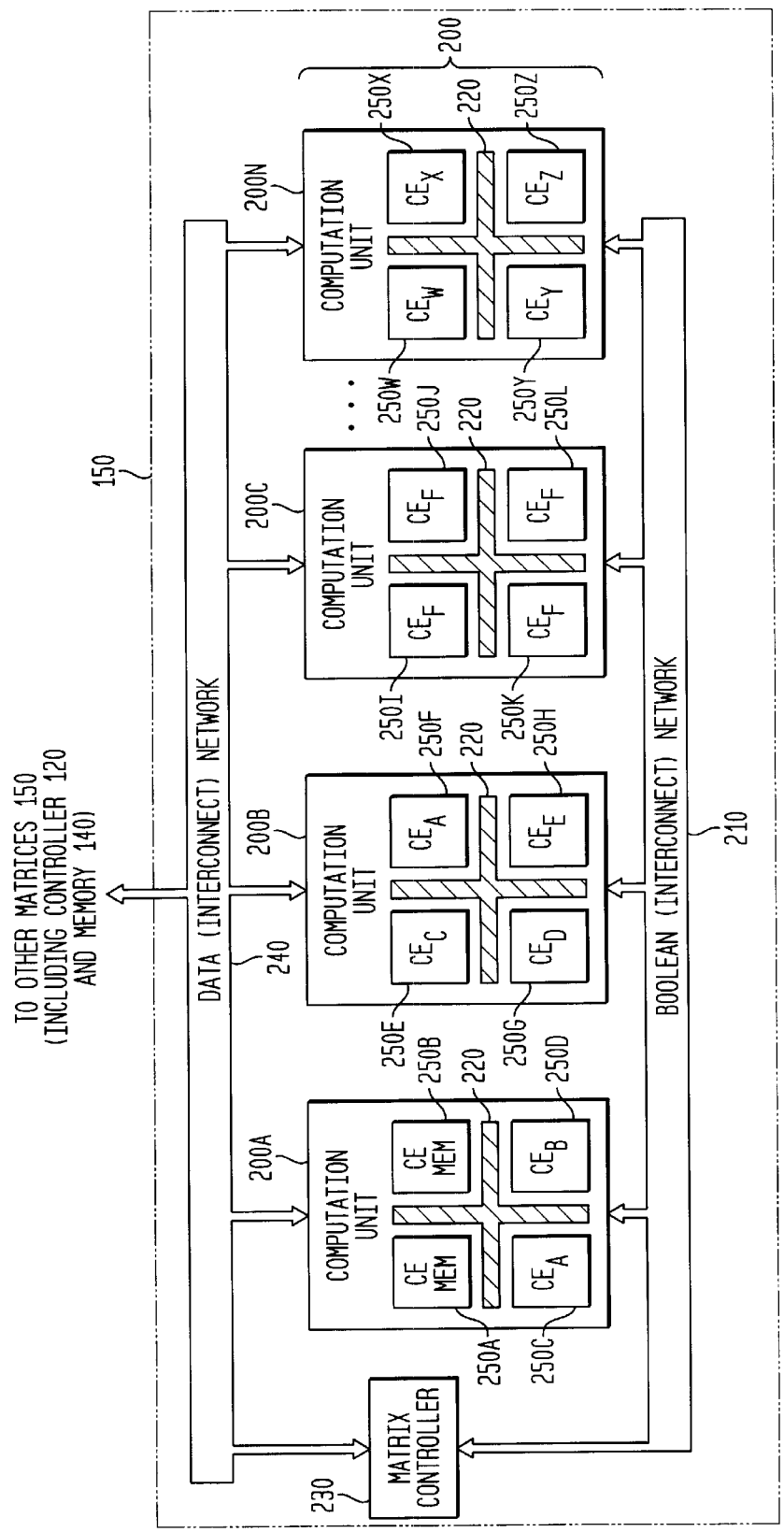
FIG. 5 is a block diagram illustrating a reconfigurable matrix, a plurality of computation units, and a plurality of computational elements, in accordance with the present invention.
Figure 6:
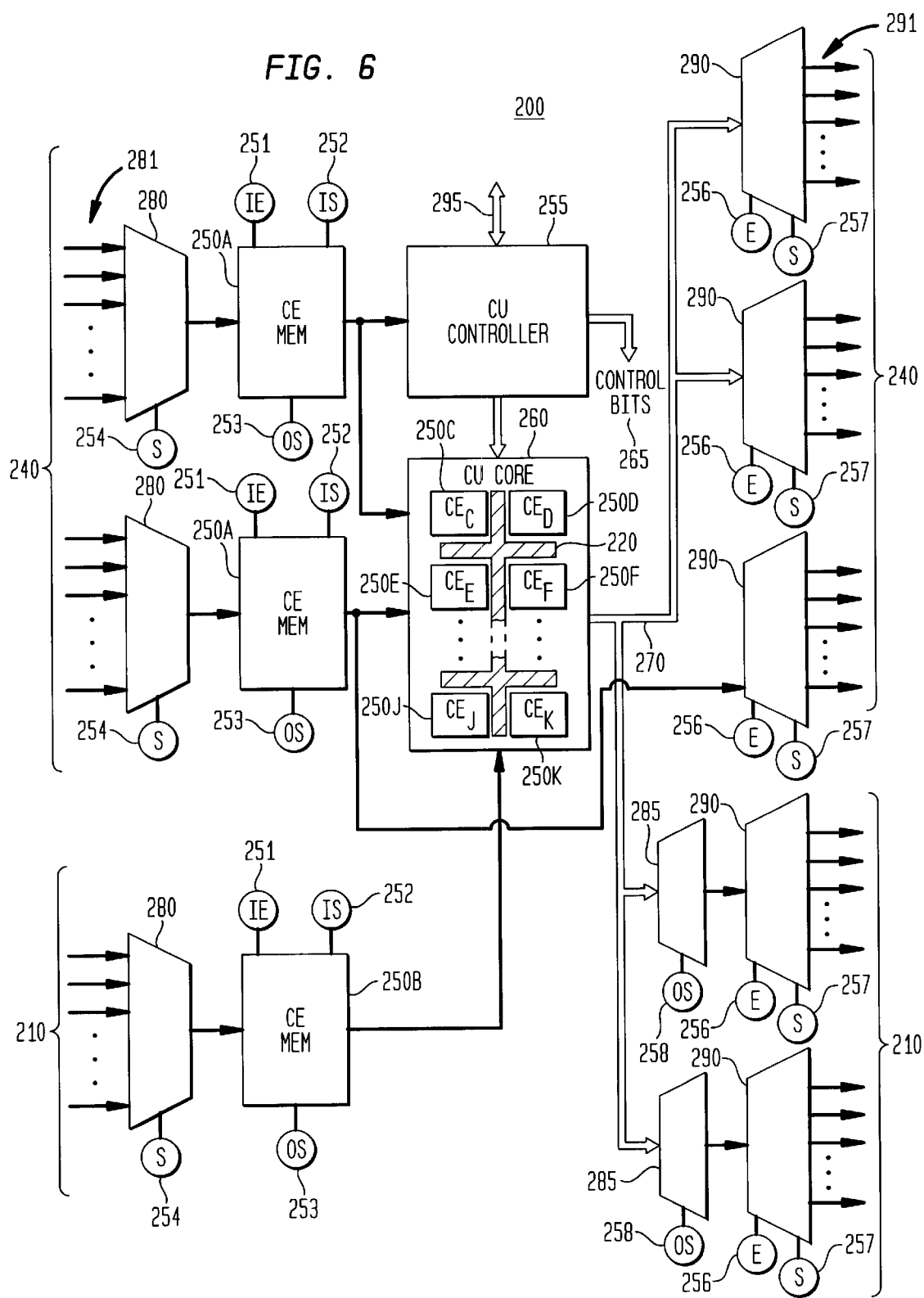
FIG. 6 is a block diagram illustrating, in greater detail, a computational unit of a reconfigurable matrix in accordance with the present invention.

The matrix interconnection network 110 of FIG. 4, and its subset interconnection networks separately illustrated in FIGS. 5 and 6 (Boolean interconnection network 210, data interconnection network 240, and interconnect 220), collectively and generally referred to herein as "interconnect", "interconnection(s)" or "interconnection network(s)", may be implemented generally as known in the art, such as utilizing field programmable gate array ("FPGA") interconnection networks or switching fabrics, albeit in a considerably more varied fashion. In the preferred embodiment, the various interconnection networks are implemented as described, for example, in U.S. Pat. No. 5,218,240, U.S. Pat. No. 5,336,950, U.S. Pat. No. 5,245,227, and U.S. Pat. No. 5,144,166, and also as discussed below and as illustrated with reference to FIGS. 7, 8 and 9. These various interconnection networks provide selectable (or switchable) connections between and among the controller 120, the memory 140, the various matrices 150, and the computational units 200 and computational elements 250 discussed below, providing the physical basis for the configuration and reconfiguration referred to herein, in response to and under the control of configuration signaling generally referred to herein as "configuration information". In addition, the various interconnection networks (110, 210, 240 and 220) provide selectable or switchable data, input, output, control and configuration paths, between and among the controller 120, the memory 140, the various matrices 150, and the computational units 200 and computational elements 250, in lieu of any form of traditional or separate input/output busses, data busses, DMA, RAM, configuration and instruction busses.

It should be pointed out, however, that while any given switching or selecting operation of or within the various interconnection networks (110, 210, 240 and 220) may be implemented as known in the art, the design and layout of the various interconnection networks (110, 210, 240 and 220), in accordance with the present invention, are new and novel, as discussed in greater detail below. For example, varying levels of interconnection are provided to correspond to the varying levels of the matrices 150, the computational units 200, and the computational elements 250, discussed below. At the matrix 150 level, in comparison with the prior art FPGA interconnect, the matrix interconnection network 110 is considerably more limited and less "rich", with lesser connection capability in a given area, to reduce capacitance and increase speed of operation. Within a particular matrix 150 or computational unit 200, however, the interconnection network (210, 220 and 240) may be considerably more dense and rich, to provide greater adaptation and reconfiguration capability within a narrow or close locality of reference.

The various matrices or nodes 150 are reconfigurable and heterogeneous, namely, in general, and depending upon the desired configuration: reconfigurable matrix 150A is generally different from reconfigurable matrices 150B through 150N; reconfigurable matrix 150B is generally different from reconfigurable matrices 150A and 150C through 150N; reconfigurable matrix 150C is generally different from reconfigurable matrices 150A, 150B and 150D through 150N, and so on. The various reconfigurable matrices 150 each generally contain a different or varied mix of adaptive and reconfigurable computational (or computation) units (200); the computational units 200, in turn, generally contain a different or varied mix of fixed, application specific computational elements (250), discussed in greater detail below with reference to FIGS. 5 and 6 which may be adaptively connected, configured and reconfigured in various ways to perform varied functions, through the various interconnection networks. In addition to varied internal configurations and reconfigurations, the various matrices 150 may be connected, configured and reconfigured at a higher level, with respect to each of the other matrices 150, through the matrix interconnection network 110, also as discussed in greater detail below.

Several different, insightful and novel concepts are incorporated within the ACE 100 architecture of the present invention, and provide a useful explanatory basis for the real-time operation of the ACE 100 and its inherent advantages.

The first novel concepts of the present invention concern the adaptive and reconfigurable use of application specific, dedicated or fixed hardware units (computational elements 250), and the selection of particular functions for acceleration, to be included within these application specific, dedicated or fixed hardware units (computational elements 250) within the computational units 200 (FIG. 5) of the matrices 150, such as pluralities of multipliers, complex multipliers, and adders, each of which are designed for optimal execution of corresponding multiplication, complex multiplication, and addition functions. Given that the ACE 100 is to be optimized, in the preferred embodiment, for low power consumption, the functions for acceleration are selected based upon power consumption. For example, for a given application such as mobile communication, corresponding C (C+ or C++) or other code may be analyzed for power consumption. Such empirical analysis may reveal, for example, that a small portion of such code, such as 10%, actually consumes 90% of the operating power when executed. In accordance with the present invention, on the basis of such power utilization, this small portion of code is selected for acceleration within certain types of the reconfigurable matrices 150, with the remaining code, for example, adapted to run within matrices 150 configured as controller 120. Additional code may also be selected for acceleration, resulting in an optimization of power consumption by the ACE 100, up to any potential trade-off resulting from design or operational complexity. In addition, as discussed with respect to FIG. 5, other functionality, such as control code, may be accelerated within matrices 150 when configured as finite state machines.

Also as indicated above, for the multimode rake receiver 50 of the present invention, various fixed, application specific computational elements 250 may be utilized in the preferred embodiment, such as multipliers and complex multipliers for dispreading, tapped delay lines, PN generators, correlators, and other demodulation functions. Through the varying levels of interconnect, corresponding algorithms are then implemented, at any given time, through the configuration and reconfiguration of fixed computational elements (250), namely, implemented within hardware which has been optimized and configured for efficiency, i.e., a "machine" is configured in real-time which is optimized to perform the particular algorithm.

The next and perhaps most significant concept of the present invention, and a marked departure from the concepts and precepts of the prior art, is the concept of reconfigurable "heterogeneity" utilized to implement the various selected algorithms mentioned above. As indicated in the related application, prior art reconfigurability has relied exclusively on homogeneous FPGAs, in which identical blocks of logic gates are repeated as an array within a rich, programmable interconnect, with the interconnect subsequently configured to provide connections between and among the identical gates to implement a particular function, albeit inefficiently and often with routing and combinatorial problems. In stark contrast, in accordance with the present invention, within computation units 200, different computational elements (250) are implemented directly as correspondingly different fixed (or dedicated) application specific hardware, such as dedicated multipliers, complex multipliers, and adders. Utilizing interconnect (210 and 220), these differing, heterogeneous computational elements (250) may then be adaptively configured, in real-time, to perform the selected algorithm, such as the performance of discrete cosine transformations often utilized in mobile communications. As a consequence, in accordance with the present invention, different ("heterogeneous") computational elements (250) are configured and reconfigured, at any given time, to optimally perform a given algorithm or other function. In addition, for repetitive functions, a given instantiation or configuration of computational elements may also remain in place over time, i.e., unchanged, throughout the course of such repetitive calculations.

The temporal nature of the ACE 100 architecture should also be noted. At any given instant of time, utilizing different levels of interconnect (110, 210, 240 and 220), a particular configuration may exist within the ACE 100 which has been optimized to perform a given function or implement a particular algorithm, such as to implement pilot signal searching. At another instant in time, the configuration may be changed, to interconnect other computational elements (250) or connect the same computational elements 250 differently, for the performance of another function or algorithm, such as multipath reception. Two important features arise from this temporal reconfigurability. First, as algorithms may change over time to, for example, implement a new technology standard, the ACE 100 may co-evolve and be reconfigured to implement the new algorithm. Second, because computational elements are interconnected at one instant in time, as an instantiation of a given algorithm, and then reconfigured at another instant in time for performance of another, different algorithm, gate (or transistor) utilization is maximized, providing significantly better performance than the most efficient ASICs relative to their activity factors.

This temporal reconfigurability of computational elements 250, for the performance of various different algorithms, also illustrates a conceptual distinction utilized herein between configuration and reconfiguration, on the one hand, and programming or reprogrammability, on the other hand. Typical programmability utilizes a pre-existing group or set of functions, which may be called in various orders, over time, to implement a particular algorithm. In contrast, configurability and reconfigurability, as used herein, includes the additional capability of adding or creating new functions which were previously unavailable or non-existent.

Next, the present invention also utilizes a tight coupling (or interdigitation) of data and configuration (or other control) information, within one, effectively continuous stream of information. This coupling or commingling of data and configuration information, referred to as a "silverware" module, is the subject of another, second related patent application. For purposes of the present invention, however, it is sufficient to note that this coupling of data and configuration information into one information (or bit) stream helps to enable real-time reconfigurability of the ACE 100, without a need for the (often unused) multiple, overlaying networks of hardware interconnections of the prior art. For example, as an analogy, a particular, first configuration of computational elements at a particular, first period of time, as the hardware to execute a corresponding algorithm during or after that first period of time, may be viewed or conceptualized as a hardware analog of "calling" a subroutine in software which may perform the same algorithm. As a consequence, once the configuration of the computational elements has occurred (i.e., is in place), as directed by the configuration information, the data for use in the algorithm is immediately available as part of the silverware module. The same computational elements may then be reconfigured for a second period of time, as directed by second configuration information, for execution of a second, different algorithm, also utilizing immediately available data. The immediacy of the data, for use in the configured computational elements, provides a one or two clock cycle hardware analog to the multiple and separate software steps of determining a memory address and fetching stored data from the addressed registers. This has the further result of additional efficiency, as the configured computational elements may execute, in comparatively few clock cycles, an algorithm which may require orders of magnitude more clock cycles for execution if called as a subroutine in a conventional microprocessor or DSP.

This use of silverware modules, as a commingling of data and configuration information, in conjunction with the real-time reconfigurability of a plurality of heterogeneous and fixed computational elements 250 to form adaptive, different and heterogeneous computation units 200 and matrices 150, enables the ACE 100 architecture to have multiple and different modes of operation. For example, when included within a hand-held device, given a corresponding silverware module, the ACE 100 may have various and different operating modes as a cellular or other mobile telephone, a music player, a pager, a personal digital assistant, and other new or existing functionalities. In addition, these operating modes may change based upon the physical location of the device; for example, when configured as a CDMA mobile telephone for use in the United States, the ACE 100 may be reconfigured as a GSM mobile telephone for use in Europe.

Referring again to FIG. 4, the functions of the controller 120 (preferably matrix (KARC) 150A and matrix (MARC) 150B, configured as finite state machines) may be explained with reference to a silverware module, namely, the tight coupling of data and configuration information within a single stream of information, with reference to multiple potential modes of operation, with reference to the reconfigurable matrices 150, and with reference to the reconfigurable computation units 200 and the computational elements 150 illustrated in FIG. 5. As indicated above, through a silverware module, the ACE 100 may be configured or reconfigured to perform a new or additional function, such as an upgrade to a new technology standard or the addition of an entirely new function, such as the addition of a music function to a mobile communication device. Such a silverware module may be stored in the matrices 150 of memory 140, or may be input from an external (wired or wireless) source through, for example, matrix interconnection network 110. In the preferred embodiment, one of the plurality of matrices 150 is configured to decrypt such a module and verify its validity, for security purposes. Next, prior to any configuration or reconfiguration of existing ACE 100 resources, the controller 120, through the matrix (KARC) 150A, checks and verifies that the configuration or reconfiguration may occur without adversely affecting any pre-existing functionality, such as whether the addition of music functionality would adversely affect pre-existing mobile communications functionality. In the preferred embodiment, the system requirements for such configuration or reconfiguration are included within the silverware module, for use by the matrix (KARC) 150A in performing this evaluative function. If the configuration or reconfiguration may occur without such adverse affects, the silverware module is allowed to load into the matrices 150 of memory 140, with the matrix (KARC) 150A setting up the DMA engines within the matrices 150C and 150D of the memory 140 (or other stand-alone DMA engines of a conventional memory). If the configuration or reconfiguration would or may have such adverse affects, the matrix (KARC) 150A does not allow the new module to be incorporated within the ACE 100.

Continuing to refer to FIG. 4, the matrix (MARC) 150B manages the scheduling of matrix 150 resources and the timing of any corresponding data, to synchronize any configuration or reconfiguration of the various computational elements 250 and computation units 200 with any corresponding input data and output data. In the preferred embodiment, timing information is also included within a silverware module, to allow the matrix (MARC) 150B through the various interconnection networks to direct a reconfiguration of the various matrices 150 in time, and preferably just in time, for the reconfiguration to occur before corresponding data has appeared at any inputs of the various reconfigured computation units 200. In addition, the matrix (MARC) 150B may also perform any residual processing which has not been accelerated within any of the various matrices 150. As a consequence, the matrix (MARC) 150B may be viewed as a control unit which "calls" the configurations and reconfigurations of the matrices 150, computation units 200 and computational elements 250, in real-time, in synchronization with any corresponding data to be utilized by these various reconfigurable hardware units, and which performs any residual or other control processing. Other matrices 150 may also include this control functionality, with any given matrix 150 capable of calling and controlling a configuration and reconfiguration of other matrices 150.

FIG. 5 is a block diagram illustrating, in greater detail, a reconfigurable matrix 150 with a plurality of computation units 200 (illustrated as computation units 200A through 200N), and a plurality of computational elements 250 (illustrated as computational elements 250A through 250Z), and provides additional illustration of the preferred types of computational elements 250 and a useful summary of the present invention. As illustrated in FIG. 5, any matrix 150 generally includes a matrix controller 230, a plurality of computation (or computational) units 200, and as logical or conceptual subsets or portions of the matrix interconnect network 110, a data interconnect network 240 and a Boolean interconnect network 210. As mentioned above, in the preferred embodiment, at increasing "depths" within the ACE 100 architecture, the interconnect networks become increasingly rich, for greater levels of adaptability and reconfiguration. The Boolean interconnect network 210, also as mentioned above, provides the reconfiguration and data interconnection capability between and among the various computation units 200, and is preferably small (i.e., only a few bits wide), while the data interconnect network 240 provides the reconfiguration and data interconnection capability for data input and output between and among the various computation units 200, and is preferably comparatively large (i.e., many bits wide). It should be noted, however, that while conceptually divided into reconfiguration and data capabilities, any given physical portion of the matrix interconnection network 110, at any given time, may be operating as either the Boolean interconnect network 210, the data interconnect network 240, the lowest level interconnect 220 (between and among the various computational elements 250), or other input, output, or connection functionality.

Continuing to refer to FIG. 5, included within a computation unit 200 are a plurality of computational elements 250, illustrated as computational elements 250A through 250Z (individually and collectively referred to as computational elements 250), and additional interconnect 220. The interconnect 220 provides the reconfigurable interconnection capability and input/output paths between and among the various computational elements 250. As indicated above, each of the various computational elements 250 consist of dedicated, application specific hardware designed to perform a given task or range of tasks, resulting in a plurality of different, fixed computational elements 250. Utilizing the interconnect 220, the fixed computational elements 250 may be reconfigurably connected together into adaptive and varied computational units 200, which also may be further reconfigured and interconnected, to execute an algorithm or other function, at any given time, such as the pilot signal searching or the multipath reception and combining discussed above, utilizing the interconnect 220, the Boolean network 210, and the matrix interconnection network 110.

In the preferred embodiment, the various computational elements 250 are designed and grouped together, into the various adaptive and reconfigurable computation units 200 (as illustrated, for example, in FIGS. 5A through 9). In addition to computational elements 250 which are designed to execute a particular algorithm or function, such as multiplication, correlation, or addition, other types of computational elements 250 are also utilized in the preferred embodiment. As illustrated in FIG. 3, computational elements 250A and 250B implement memory, to provide local memory elements for any given calculation or processing function (compared to the more "remote" memory 140). In addition, computational elements 250I, 250J, 250K and 250L are configured to implement finite state machines (using, for example, the computational elements illustrated in FIGS. 7, 8 and 9), to provide local processing capability (compared to the more "remote" matrix (MARC) 150B), especially suitable for complicated control processing.

With the various types of different computational elements 250 which may be available, depending upon the desired functionality of the ACE 100, the computation units 200 may be loosely categorized. A first category of computation units 200 includes computational elements 250 performing linear operations, such as multiplication, addition, finite impulse response filtering, and so on (as illustrated below, for example, with reference to FIG. 7). A second category of computation units 200 includes computational elements 250 performing non-linear operations, such as discrete cosine transformation, trigonometric calculations, and complex multiplications. A third type of computation unit 200 implements a finite state machine, such as computation unit 200C as illustrated in FIG. 5 and as illustrated in greater detail below with respect to FIGS. 7 through 9), particularly useful for complicated control sequences, dynamic scheduling, and input/output management, while a fourth type may implement memory and memory management, such as computation unit 200A as illustrated in FIG. 4. Lastly, a fifth type of computation unit 200 may be included to perform bit-level manipulation, such as for encryption, decryption, channel coding, Viterbi decoding, and packet and protocol processing (such as Internet Protocol processing).

In the preferred embodiment, in addition to control from other matrices or nodes 150, a matrix controller 230 may also be included within any given matrix 150, also to provide greater locality of reference and control of any reconfiguration processes and any corresponding data manipulations. For example, once a reconfiguration of computational elements 250 has occurred within any given computation unit 200, the matrix controller 230 may direct that that particular instantiation (or configuration) remain intact for a certain period of time to, for example, continue repetitive data processing for a given application.

FIG. 6 is a block diagram illustrating, in greater detail, an exemplary or representative computation unit 200 of a reconfigurable matrix 150 in accordance with the present invention. As illustrated in FIG. 6, a computation unit 200 typically includes a plurality of diverse, heterogeneous and fixed computational elements 250, such as a plurality of memory computational elements 250A and 250B, and forming a computational unit ("CU") core 260, a plurality of algorithmic or finite state machine computational elements 250C through 250K. As discussed above, each computational element 250, of the plurality of diverse computational elements 250, is a fixed or dedicated, application specific circuit, designed and having a corresponding logic gate layout to perform a specific function or algorithm, such as addition or multiplication. In addition, the various memory computational elements 250A and 250B may be implemented with various bit depths, such as RAM (having significant depth), or as a register, having a depth of 1 or 2 bits.

Forming the conceptual data and Boolean interconnect networks 240 and 210, respectively, the exemplary computation unit 200 also includes a plurality of input multiplexers 280, a plurality of input lines (or wires) 281, and for the output of the CU core 260 (illustrated as line or wire 270), a plurality of output demultiplexers 285 and 290, and a plurality of output lines (or wires) 291. Through the input multiplexers 280, an appropriate input line 281 may be selected for input use in data transformation and in the configuration and interconnection processes, and through the output demultiplexers 285 and 290, an output or multiple outputs may be placed on a selected output line 291, also for use in additional data transformation and in the configuration and interconnection processes.

In the preferred embodiment, the selection of various input and output lines 281 and 291, and the creation of various connections through the interconnect (210, 220 and 240), is under control of control bits 265 from the computational unit controller 255, as discussed below. Based upon these control bits 265, any of the various input enables 251, input selects 252, output selects 253, MUX selects 254, DEMUX enables 256, DEMUX selects 257, and DEMUX output selects 258, may be activated or deactivated.

The exemplary computation unit 200 includes a computation unit controller 255 which provides control, through control bits 265, over what each computational element 250, interconnect (210, 220 and 240), and other elements (above) does with every clock cycle. Not separately illustrated, through the interconnect (210, 220 and 240), the various control bits 265 are distributed, as may be needed, to the various portions of the computation unit 200, such as the various input enables 251, input selects 252, output selects 253, MUX selects 254, DEMUX enables 256, DEMUX selects 257, and DEMUX output selects 258. The CU controller 255 also includes one or more lines 295 for reception of control (or configuration) information and transmission of status information.

As mentioned above, the interconnect may include a conceptual division into a data interconnect network 240 and a Boolean interconnect network 210, of varying bit widths, as mentioned above. In general, the (wider) data interconnection network 240 is utilized for creating configurable and reconfigurable connections, for corresponding routing of data and configuration information. The (narrower) Boolean interconnect network 210, while also utilized for creating configurable and reconfigurable connections, is utilized for control of logic (or Boolean) decisions of the various data flow graphs, generating decision nodes in such DFGs, and may also be used for data routing within such DFGs.

Figure 7B:
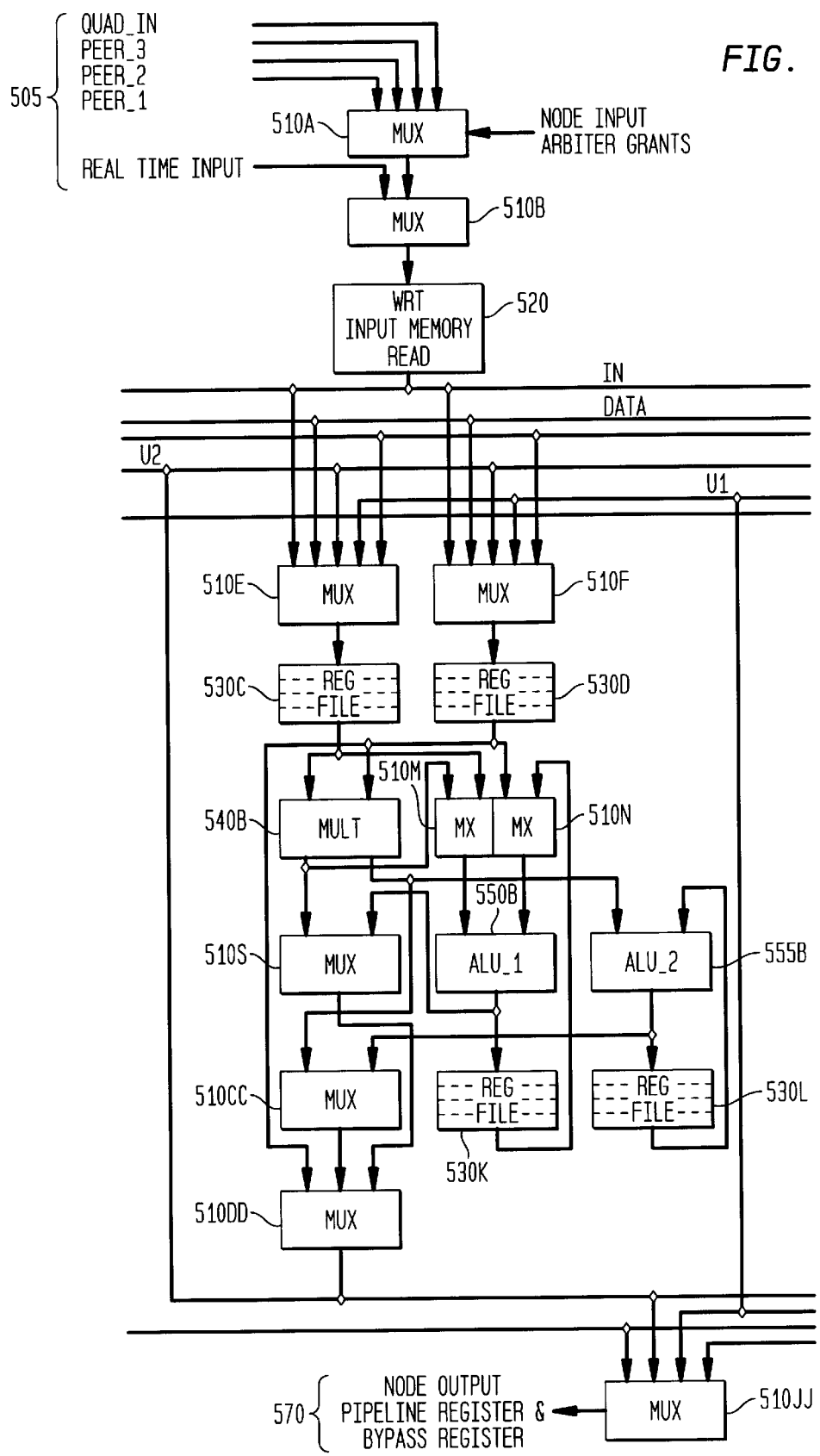
FIG. 7 is a block diagram illustrating, in detail, a preferred multi-function adaptive computational unit having a plurality of different, fixed computational elements, in accordance with the present invention.
Figure 7C:
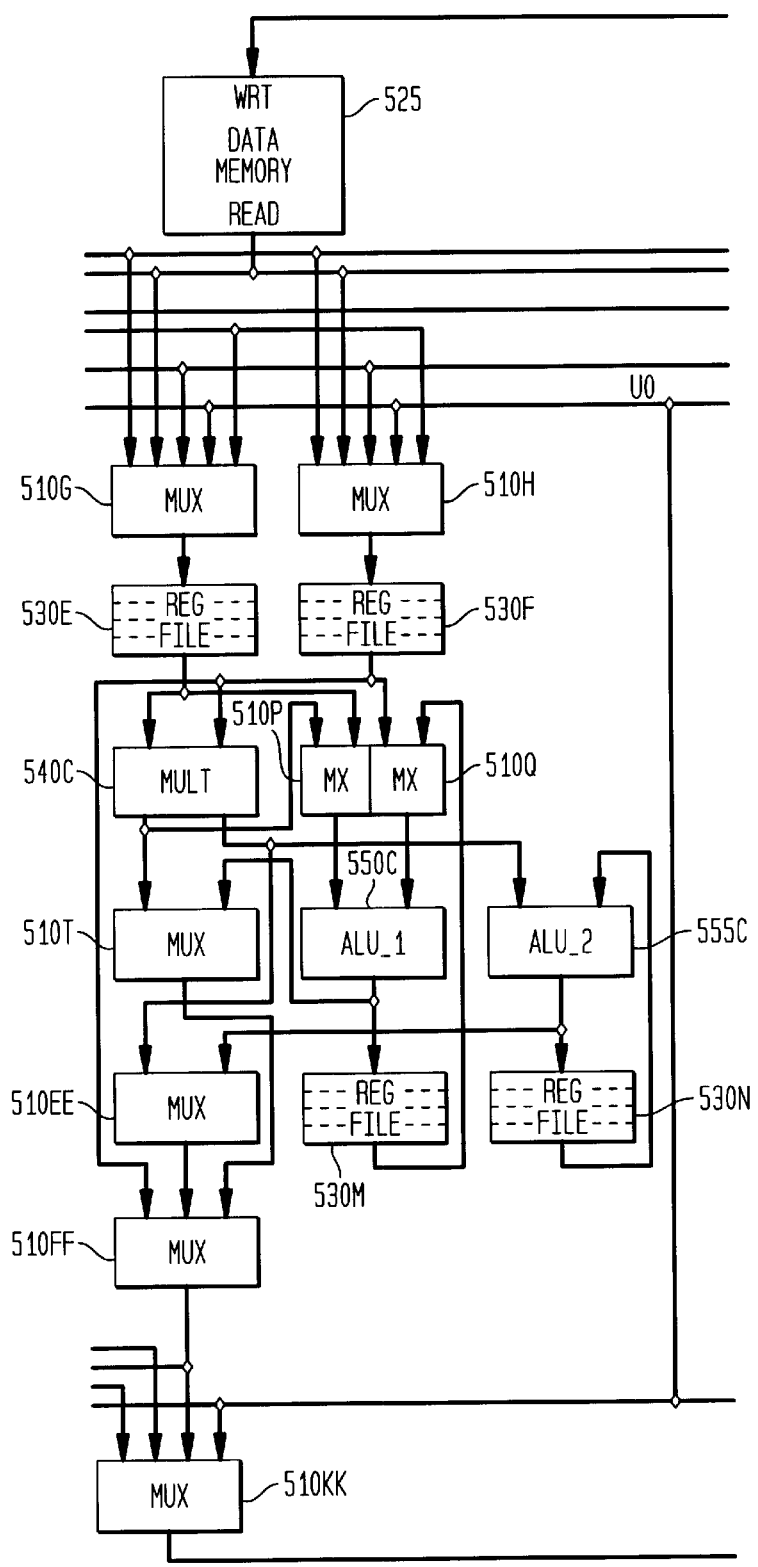
Figure 7D:
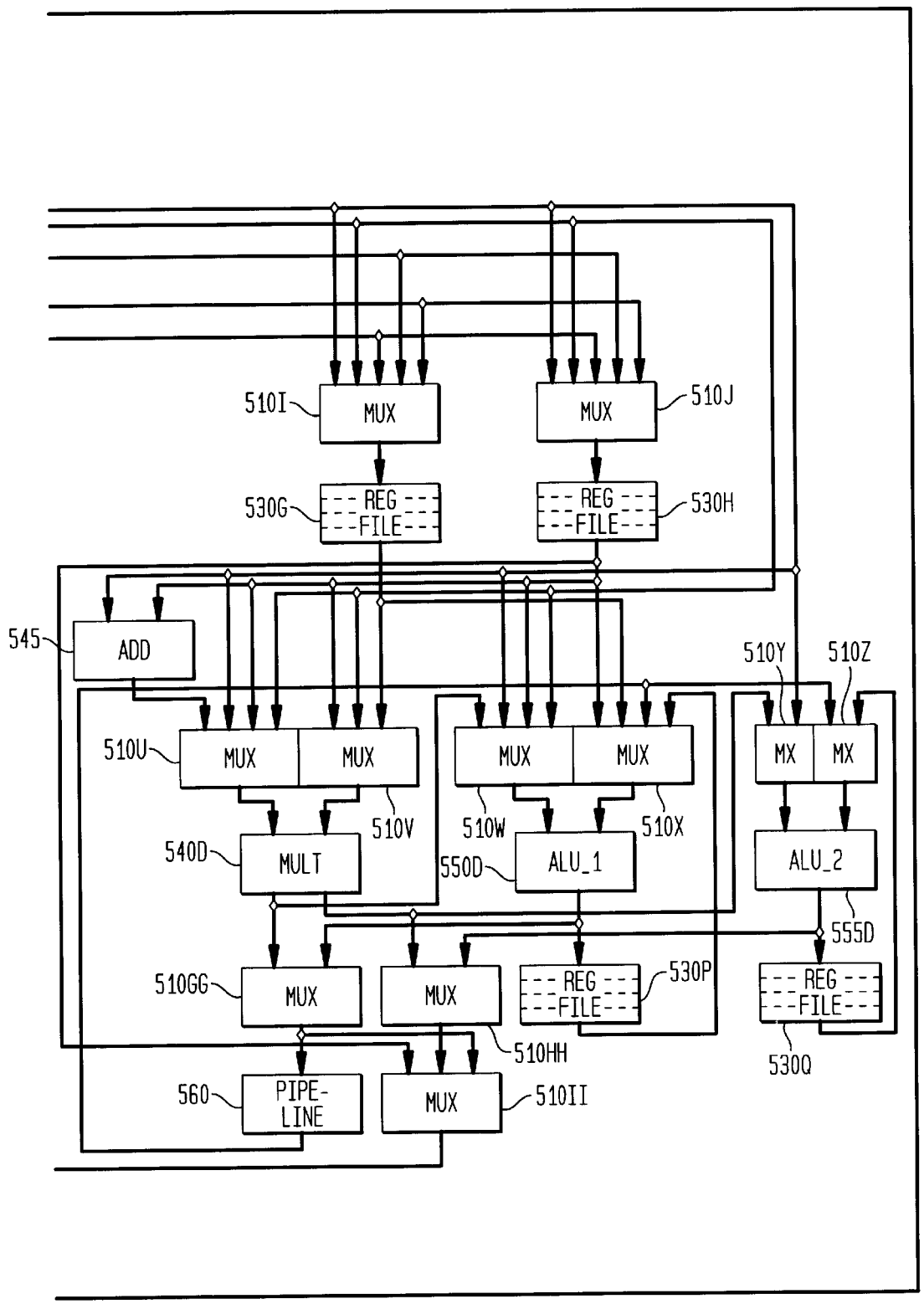

FIG. 7 is a block diagram illustrating, in detail, an exemplary, preferred multi-function adaptive computational unit 500 having a plurality of different, fixed computational elements, in accordance with the present invention. When configured accordingly, the adaptive computation unit 500 performs a wide variety of functions discussed in the related application, such as finite impulse response filter, fast Fourier transformation, and other functions such as discrete cosine transformation. As illustrated, this multi-function adaptive computational unit 500 includes capability for a plurality of configurations of a plurality of fixed computational elements, including input memory 520, data memory 525, registers 530 (illustrated as registers 530A through 530Q), multipliers 540 (illustrated as multipliers 540A through 540D), adder 545, first arithmetic logic unit (ALU) 550 (illustrated as ALU_1s 550A through 550D), second arithmetic logic unit (ALU) 555 (illustrated as ALU_2s 555A through 555D), and pipeline (length l) register 560, with inputs 505, lines 515, outputs 570, and multiplexers (MUXes or MXes) 510 (illustrates as MUXes and MXes 510A through 510KK) forming an interconnection network (210, 220 and 240). The two different ALUs 550 and 555 are preferably utilized, for example, for parallel addition and subtraction operations, particularly useful for radix 2 operations in discrete cosine transformation.

Figure 8:
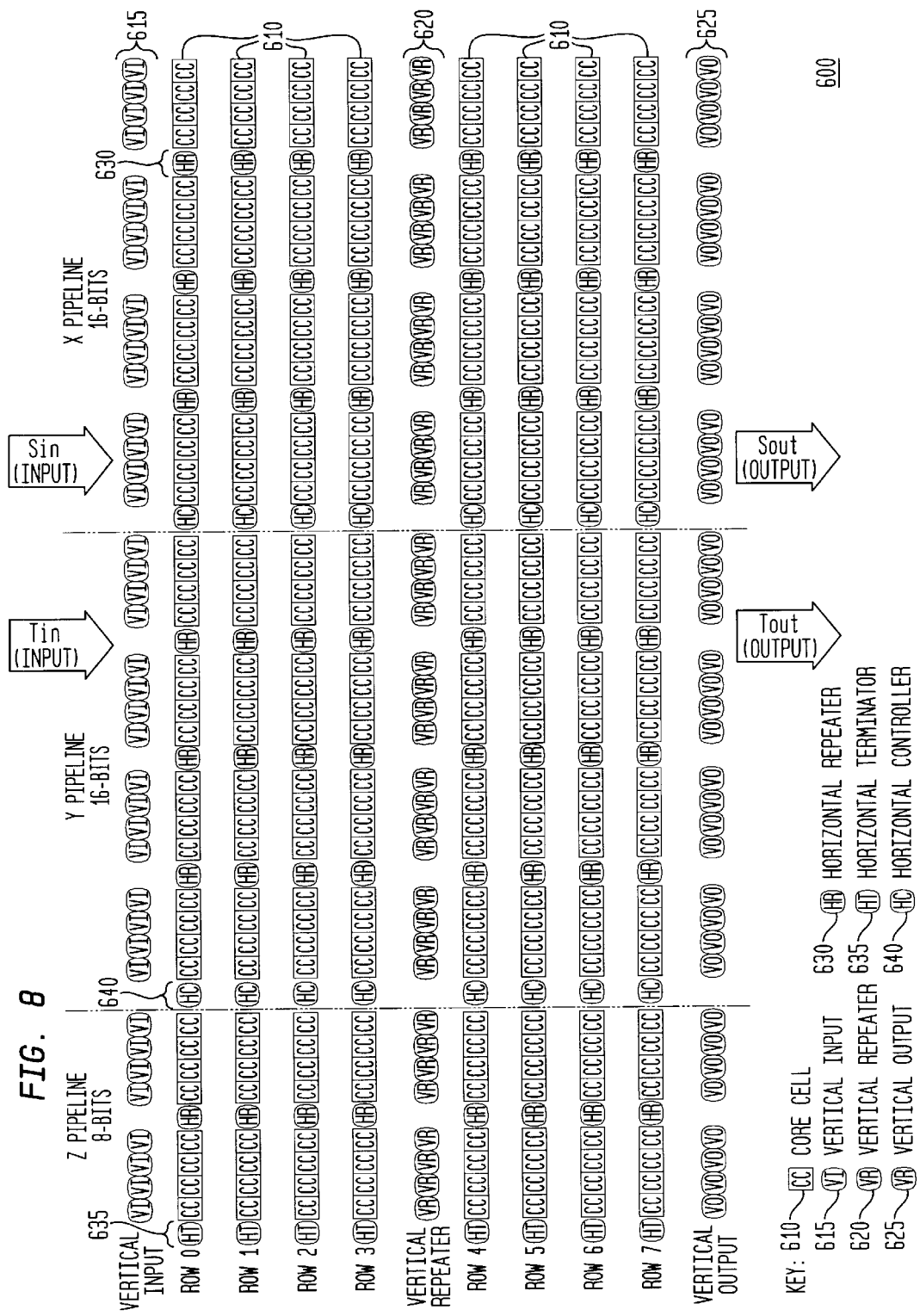
FIG. 8 is a block diagram illustrating, in detail, a preferred adaptive logic processor computational unit having a plurality of fixed computational elements, in accordance with the present invention.

FIG. 8 is a block diagram illustrating, in detail, a preferred adaptive logic processor (ALP) computational unit 600 having a plurality of fixed computational elements, in accordance with the present invention. The ALP 600 is highly adaptable, and is preferably utilized for input/output configuration, finite state machine implementation, general field programmability, and bit manipulation. The fixed computational element of ALP 600 is a portion (650) of each of the plurality of adaptive core cells (CCs) 610 (FIG. 9), as separately illustrated in FIG. 10. An interconnection network (210, 220 and 240) is formed from various combinations and permutations of the pluralities of vertical inputs (VIs) 615, vertical repeaters (VRs) 620, vertical outputs (VOs) 625, horizontal repeaters (HRs) 630, horizontal terminators (HTs) 635, and horizontal controllers (HCs) 640.

Figure 9:
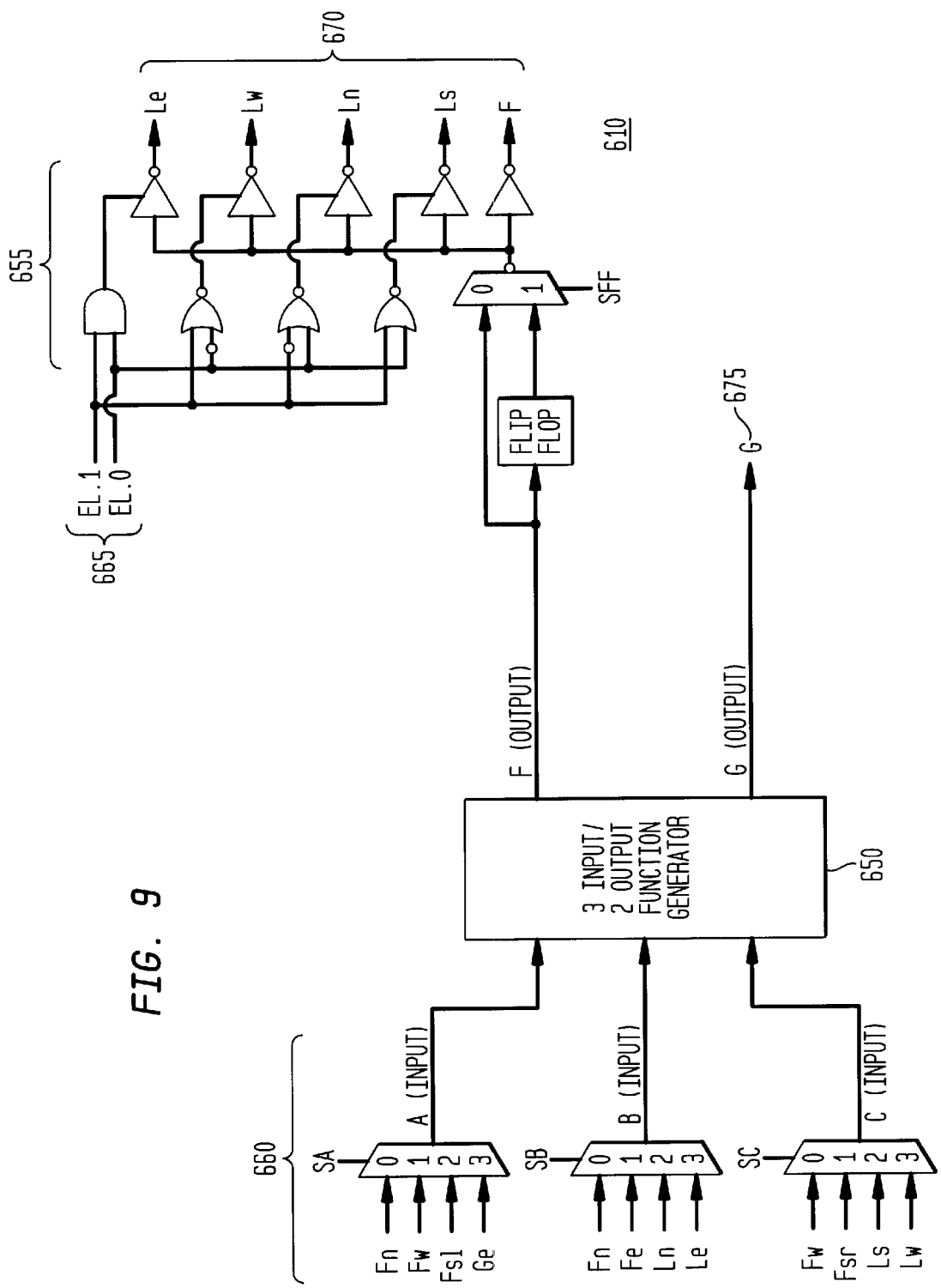
FIG. 9 is a block diagram illustrating, in greater detail, a preferred core cell of an adaptive logic processor computational unit with a fixed computational element, in accordance with the present invention.

FIG. 9 is a block diagram illustrating, in greater detail, a preferred core cell 610 of an adaptive logic processor computational unit 600 with a fixed computational element 650, in accordance with the present invention. The fixed computational element is a 3 input-2 output function generator 550, separately illustrated in FIG. 10. The preferred core cell 610 also includes control logic 655, control inputs 665, control outputs 670 (providing output interconnect), output 675, and inputs (with interconnect muxes) 660 (providing input interconnect).

FIG. 10 is a block diagram illustrating, in greater detail, a preferred fixed computational element 650 of a core cell 610 of an adaptive logic processor computational unit 600, in accordance with the present invention. The fixed computational element 650 is comprised of a fixed layout of pluralities of exclusive NOR (XNOR) gates 680, NOR gates 685, NAND gates 690, and exclusive OR (XOR) gates 695, with three inputs 720 and two outputs 710. Configuration and interconnection is provided through MUX 705 and interconnect inputs 730.

As may be apparent from the discussion above, this use of a plurality of fixed, heterogeneous computational elements (250), which may be configured and reconfigured to form heterogeneous computation units (200), which further may be configured and reconfigured to form heterogeneous matrices 150, through the varying levels of interconnect (110, 210, 240 and 220), creates an entirely new class or category of integrated circuit, which may be referred to as an adaptive computing architecture. It should be noted that the adaptive computing architecture of the present invention cannot be adequately characterized, from a conceptual or from a nomenclature point of view, within the rubric or categories of FPGAs, ASICs or processors. For example, the non-FPGA character of the adaptive computing architecture is immediately apparent because the adaptive computing architecture does not comprise either an array of identical logical units, or more simply, a repeating array of any kind. Also for example, the non-ASIC character of the adaptive computing architecture is immediately apparent because the adaptive computing architecture is not application specific, but provides multiple modes of functionality and is reconfigurable in real-time. Continuing with the example, the non-processor character of the adaptive computing architecture is immediately apparent because the adaptive computing architecture becomes configured, to directly operate upon data, rather than focusing upon executing instructions with data manipulation occurring as a byproduct.

Yet additional advantages of the present invention may be further apparent to those of skill in the art. The ACE 100 architecture of the present invention effectively and efficiently combines and maximizes the various advantages of processors, ASICs and FPGAs, while minimizing potential disadvantages. The ACE 100 includes the programming flexibility of a processor, the post-fabrication flexibility of FPGAs, and the high speed and high utilization factors of an ASIC. The ACE 100 is readily reconfigurable, in real-time, and is capable of having corresponding, multiple modes of operation. In addition, through the selection of particular functions for reconfigurable acceleration, the ACE 100 minimizes power consumption and is suitable for low power applications, such as for use in hand-held and other battery-powered devices.

The adaptive and reconfigurable multimode rake receiver 50, for dynamic search and multipath reception, in accordance with the present invention, provides numerous additional advantages. The dynamic allocation of limited computational element resources between multipath reception and searching functionality provides several types of improved system performance, such as higher quality transmissions due to improved multipath reception, and fewer dropped or degraded calls due to increased and improved searching capability. In addition, for next generation systems, such as 3G or CDMA 2000, which may require an increased number of rake fingers for multipath reception, while simultaneously increasing spreading code lengths, resulting in additional searching and correlation requirements, the dynamic allocation of limited computational element resources between multipath reception and searching functionality, in accordance with the present invention, is especially useful and timely, providing a cost-effective and power saving solution to address the requirements for increased performance and processing capability.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A multimode rake receiver, comprising:
   a network interface;
   a plurality of adaptive multimode rake fingers coupled to the network interface, the plurality of adaptive multimode rake fingers comprising a first plurality of heterogeneous computational elements having at least two different fixed architectures, wherein the first plurality of heterogeneous computational elements are configurable to form the plurality of adaptive multimode rake fingers, the first plurality of heterogeneous computational elements are capable of responding to a first mode signal to configure for a first functional mode for path reception, capable of responding to a second mode signal to configure for a second functional mode for searching, and capable of responding to a third mode signal to configure for a third functional mode; and
   a multimode processor coupled to the plurality of adaptive multimode rake fingers, the multimode processor capable of responding to the first mode signal to configure for the first functional mode for path reception, capable of responding to the second mode signal to configure for the second functional mode for searching, and further capable of responding to the third mode signal to configure for a third functional mode.

2. The multimode rake receiver of claim 1, wherein when the multimode rake receiver is in an acquisition mode, all adaptive multimode rake fingers of the plurality of adaptive multimode rake fingers are configured for the second functional mode for searching and the multimode processor is configured for the second functional mode for searching.

3. The multimode rake receiver of claim 1, wherein when the multimode rake receiver is in a traffic mode:
   a first subset of adaptive multimode rake fingers of the plurality of adaptive multimode rake fingers are configured for the second functional mode for searching and a first portion of the multimode processor is configured for the second functional mode for searching; and
   a second subset of adaptive multimode rake fingers of the plurality of adaptive multimode rake fingers are configured for the first functional mode for path reception and a second portion of the multimode processor is configured for the first functional mode for path reception.

4. The multimode rake receiver of claim 3, wherein the second subset of adaptive multimode rake fingers configured for the first functional mode for path reception corresponds to a number of multipaths determined by the first subset of adaptive multimode rake fingers and the first portion of the multimode processor when configured for the second functional mode for searching.

5. The multimode rake receiver of claim 3, wherein the first subset of adaptive multimode rake fingers configured for the second functional mode for searching and the second subset of adaptive multimode rake fingers configured for the first functional mode for path reception are dynamically determined based upon at least one channel-dependent parameter selected from a plurality of channel-dependent parameters, the plurality of channel-dependent parameters comprising a pilot signal relative power level, a number of identified multipaths, a number of identified base stations, received traffic signal-to-noise ratio, and received traffic error rate.

6. The multimode rake receiver of claim 1, wherein when the multimode rake receiver is in an idle mode:
   a first subset of adaptive multimode rake fingers of the plurality of adaptive multimode rake fingers and a first portion of the multimode processor are configured for the second functional mode for searching;
   a second subset of adaptive multimode rake fingers of the plurality of adaptive multimode rake fingers and a second portion of the multimode processor are configured for the first functional mode for path reception; and
   a third subset of adaptive multimode rake fingers of the plurality of adaptive multimode rake fingers and a third portion of the multimode processor are configured for a fourth functional mode for comparatively lower power consumption.

7. The multimode rake receiver of claim 1, wherein the first plurality of heterogeneous computational elements comprise a first computational element having a first fixed architecture and a second computational element having a second fixed architecture, the first fixed architecture being different than the second fixed architecture.

8. The multimode rake receiver of claim 7, wherein the plurality of adaptive multimode rake fingers further comprise:
   an interconnection network coupled to the first plurality of heterogeneous computational elements, the interconnection network capable of configuring the first plurality of heterogeneous computational elements for the first functional mode for path reception in response to first configuration information, the interconnection network capable of reconfiguring the first plurality of heterogeneous computational elements for the second functional mode for searching in response to second configuration information, and the interconnection network capable of reconfiguring the first plurality of heterogeneous computational elements for the third functional mode in response to third configuration information.

9. The multimode rake receiver of claim 7, wherein the first plurality of heterogeneous computational elements further comprise:
   a pseudorandom noise sequence and orthogonal code generator;
   a timing adjuster coupled to the pseudorandom noise sequence and orthogonal code generator;
   a pilot signal correlator coupled to the pseudorandom noise sequence and orthogonal code generator;
   a phase estimator coupled to the pilot signal correlator;
   a channel correlator coupled to the pseudorandom noise sequence and orthogonal code generator and the timing adjuster; and
   a phase adjuster coupled to the channel correlator.

10. The multimode rake receiver of claim 9, further comprising a plurality of outputs, including a first output from the timing adjuster, a second output from the pilot signal correlator, a third output from the channel correlator, and a fourth output from the phase adjuster, and wherein the plurality of outputs are further coupled to a multiplexer, the multiplexer capable of responding to the first configuration information to select the fourth output from the plurality of outputs to provide the first functional mode for path reception, and the multiplexer capable of responding to the second configuration information to select the first output, the second output, and the third output from the plurality of outputs to provide the second functional mode for searching.

11. The multimode rake receiver of claim 7, wherein the first fixed architecture and the second fixed architecture are selected from a plurality of specific architectures, the plurality of specific architectures comprising at least two of the following corresponding functions: memory, addition, multiplication, complex multiplication, subtraction, configuration, reconfiguration, control, input, output, and field programmability.

12. The multimode rake receiver of claim 1, wherein the multimode processor further comprises:
   a second plurality of heterogeneous computational elements, the second plurality of heterogeneous computational elements comprising a first computational element having a first fixed architecture and a second computational element having a second fixed architecture, the first fixed architecture being different than the second fixed architecture.

13. The multimode rake receiver of claim 12, wherein the multimode processor further comprises:
   an interconnection network coupled to the second plurality of heterogeneous computational elements, the interconnection network capable of configuring the second plurality of heterogeneous computational elements for the first functional mode path reception in response to the first configuration information, the interconnection network further capable of reconfiguring the second plurality of heterogeneous computational elements for the second functional mode for searching in response to second configuration information and the interconnection network further capable of reconfiguring the second plurality of heterogeneous computational elements for the second functional mode for searching in response to second configuration information.

14. The multimode rake receiver of claim 12, wherein the second plurality of heterogeneous computational elements further comprise:
   a multipath combiner; and
   a mode and path assignment processor.

15. The multimode rake receiver of claim 12, wherein the first fixed architecture and the second fixed architecture are selected from a plurality of specific architectures, the plurality of specific architectures comprising at least two of the following corresponding functions: memory, addition, multiplication, complex multiplication, subtraction, configuration, reconfiguration, control, input, output, and field programmability.

16. The multimode rake receiver of claim 1, wherein the multimode rake receiver is embodied within a mobile station.

17. The multimode rake receiver of claim 1, wherein the multimode rake receiver is embodied within a base station.

18. An apparatus for direct-sequence spread spectrum reception including multimode rake functional modes, the apparatus comprising:
   a plurality of heterogeneous computational elements, a first computational element of the plurality of computational elements having a first fixed architecture and a second computational element of the plurality of computational elements having a second fixed architecture, the first fixed architecture being different than the second fixed architecture; and
   an interconnection network coupled to the plurality of heterogeneous computational elements, the interconnection network capable of configuring the plurality of heterogeneous computational elements for a first functional mode for multipath reception in response to first configuration information, the interconnection network further capable of reconfiguring the plurality of heterogeneous computational elements for a second functional mode for searching in response to second configuration information, and the interconnection network further capable of reconfiguring the plurality of heterogeneous computational elements for a third functional mode in response to third configuration information, the third functional mode different than the first and second functional modes.

19. The apparatus of claim 18, wherein the first fixed architecture and the second fixed architecture are selected from a plurality of specific architectures, the plurality of specific architectures comprising at least two of the following corresponding functions: memory, addition, multiplication, complex multiplication, subtraction, configuration, reconfiguration, control, input, output, and field programmability.

20. The apparatus of claim 18, wherein the interconnection network reconfigurably routes data and control information between and among the plurality of heterogeneous computational elements.

21. The apparatus of claim 18, further comprising:
   a controller coupled to the plurality of heterogeneous computational elements and to the interconnection network, the controller capable of directing and scheduling the configuration of the plurality of heterogeneous computational elements for the first functional mode for multipath reception, the reconfiguration of the plurality of heterogeneous computational elements for the second functional mode for searching, and the reconfiguration of the plurality of heterogeneous computational elements for the third functional mode.

22. The apparatus of claim 18, further comprising:
a memory coupled to the plurality of heterogeneous computational elements and to the interconnection network, the memory capable of storing the first configuration information, the second configuration information, and the third configuration information.

23. The apparatus of claim 18, wherein:
the plurality of heterogeneous computational elements and the interconnection network are configured to form a plurality of adaptive multimode rake fingers to provide the first functional mode for multipath reception and the second functional mode for searching and configured to form a multimode processor coupled to the plurality of adaptive multimode rake fingers;
each adaptive multimode rake finger of the plurality of adaptive multimode rake fingers is capable of responding to the first configuration information to configure for the first functional mode for multipath reception and further capable of responding to the second configuration information to configure for the second functional mode for searching; and
the multimode processor is capable of responding to the first configuration information to configure for the first functional mode for multipath reception and further capable of responding to second configuration information to configure for the second functional mode for searching.

24. The apparatus of claim 23, wherein when the apparatus is in an acquisition mode, all adaptive multimode rake fingers of the plurality of adaptive multimode rake fingers are configured for the second functional mode for searching and the multimode processor is configured for the second functional mode for searching.

25. The apparatus of claim 23, wherein when the apparatus is in a traffic mode:
a first subset of adaptive multimode rake fingers of the plurality of adaptive multimode rake fingers and a first portion of the multimode processor are configured for the second functional mode for searching; and
a second subset of adaptive multimode rake fingers of the plurality of adaptive multimode rake fingers and a second portion of the multimode processor are configured for the first functional mode for multipath reception.

26. The apparatus of claim 25, wherein the second subset of adaptive multimode rake fingers configured for the first functional mode for multipath reception corresponds to a number of multipaths determined by the first subset of adaptive multimode rake fingers and the first portion of the multimode processor when configured for the second functional mode for searching.

27. The apparatus of claim 25, wherein the first subset of adaptive multimode rake fingers configured for the second functional mode for searching and the second subset of adaptive multimode rake fingers configured for the first functional mode for multipath reception are dynamically determined based upon at least one channel dependent parameter selected from a plurality of channel-dependent parameters, the plurality of channel-dependent parameters comprising a pilot signal relative power level, a number of identified multipaths, a number of identified base stations, received traffic signal-to-noise ratio, and received traffic error rate.

28. The apparatus of claim 23, wherein when the apparatus is in an idle mode:
a first subset of adaptive multimode rake fingers of the plurality of adaptive multimode rake fingers and a first portion of the multimode processor are configured for the second functional mode for searching;
a second subset of adaptive multimode rake fingers of the plurality of adaptive multimode rake fingers and a second portion of the multimode processor are configured for the first functional mode for multipath reception; and
a third subset of adaptive multimode rake fingers of the plurality of adaptive multimode rake fingers and a third portion of the multimode processor are configured for a fourth functional mode for comparatively lower power consumption.

29. The apparatus of claim 18, wherein the plurality of heterogeneous computational elements further comprise:
a pseudorandom noise sequence and orthogonal code generator;
a pilot signal correlator coupled to the pseudorandom noise sequence and orthogonal code generator;
a phase estimator coupled to the pilot signal correlator;
a timing adjuster coupled to the pseudorandom noise sequence and orthogonal code generator;
a channel correlator coupled to the pseudorandom noise sequence and orthogonal code generator and to the timing adjuster; and
a phase adjuster coupled to the channel correlator.

30. The apparatus of claim 18, wherein the plurality of heterogeneous computational elements further comprise:
a multipath combiner; and
a mode and path assignment processor.

31. The apparatus of claim 18, wherein the first fixed architecture and the second fixed architecture are selected from a plurality of specific architectures, the plurality of specific architectures comprising at least two of the following corresponding functions: memory, addition, multiplication, complex multiplication, subtraction, configuration, reconfiguration, control, input, output, and field programmability.

32. The apparatus of claim 18, wherein
the third functional mode is selected from a plurality of non-rake reception functional modes.

33. The apparatus of claim 18, wherein the apparatus is embodied within a mobile station.

34. The apparatus of claim 18, wherein the apparatus is embodied within a base station.

35. A method for adaptive rake reception, the comprising:
receiving an incoming signal;
configuring a plurality of heterogeneous computational elements in response to configuration information to form a plurality of adaptive multimode rake fingers;
in response to first configuration information, configuring the plurality of adaptive multimode rake fingers for a first functional mode for path reception to provide multipath reception of the incoming signal;
in response to second configuration information, configuring the plurality of adaptive multimode rake fingers for a second functional mode for searching to provide a plurality of pilot signal determinations from the incoming signal; and
in response to third configuration information, configuring the plurality of adaptive multimode rake fingers for a third functional mode, the third functional mode being different than the first and second functional modes.

36. The method of claim 35, further comprising:

in response to the first configuration information, configuring a multimode processor as a multipath combiner for the first functional mode for path reception to provide output data from the multipath reception of the incoming signal;

in response to the second configuration information, configuring the multimode processor for the second functional mode for searching to select a preferred pilot signal from the plurality of pilot signal determinations from the incoming signal; and in response to the third configuration information, configuring the multimode processor for the third functional mode.

37. The method of claim 36, further comprising:

in an acquisition mode, configuring all adaptive multimode rake fingers of the plurality of adaptive multimode rake fingers and configuring the multimode processor for the second functional mode for searching.

38. The method of claim 36, further comprising:

in a traffic mode, configuring a first subset of adaptive multimode rake fingers of the plurality of adaptive multimode rake fingers and configuring a first portion of the multimode processor for the second functional mode for searching; and in the traffic mode, configuring a second subset of adaptive multimode rake fingers of the plurality of adaptive multimode rake fingers and configuring a second portion of the multimode processor for the first functional mode for path reception.

39. The method of claim 38, wherein the second subset of adaptive multimode rake fingers configured for the first functional mode for path reception corresponds to a number of multipaths determined by the first subset of adaptive multimode rake fingers and the first portion of the multimode processor when configured for the second functional mode for searching.

40. The method of claim 38, wherein the first subset of adaptive multimode rake fingers configured for the second functional mode for searching and the second subset of adaptive multimode rake fingers configured for the first functional mode for path reception are dynamically determined based upon at least one channel dependent parameter selected from a plurality of channel-dependent parameters, the plurality of channel-dependent parameters comprising a pilot signal relative power level, a number of identified multipaths, a number of identified base stations, received traffic signal-to-noise ratio, and received traffic error rate.

41. The method of claim 36, wherein:

in an idle mode, configuring a first subset of adaptive multimode rake fingers of the plurality of adaptive multimode rake fingers for the second functional mode for searching and configuring a first portion of the multimode processor for the second functional mode for searching;

in the idle mode, configuring a second subset of adaptive multimode rake fingers of the plurality of adaptive multimode rake fingers for the first functional mode for path reception and configuring a second portion of the multimode processor for the first functional mode for path reception; and in the idle mode, configuring a third subset of adaptive multimode rake fingers of the plurality of adaptive multimode rake fingers and configuring a third portion of the multimode processor for a fourth functional mode for comparatively lower power consumption.

42. The method of claim 35, wherein the method occurs within a mobile station.

43. The method of claim 35, wherein the method occurs within a base station.

44. An apparatus for direct-sequence spread spectrum code division multiple access wireless reception, the apparatus comprising:

a plurality of heterogeneous computational elements, the plurality of heterogeneous computational elements including a first computational element having a first fixed architecture and a second computational element having a second fixed architecture, the first fixed architecture being different than the second fixed architecture; and an interconnection network coupled to the plurality of heterogeneous computational elements, the interconnection network capable of configuring the plurality of heterogeneous computational elements to form a plurality of adaptive multimode rake fingers to provide a plurality of rake functional modes and to form a multimode processor coupled to the plurality of adaptive multimode rake fingers, and the interconnection network further capable of configuring the plurality of heterogeneous computational elements to provide a non-rake functional mode.

45. The apparatus of claim 44, wherein:

each adaptive multimode rake finger of the plurality of adaptive multimode rake fingers is capable of responding to first configuration information to configure for a multipath reception functional mode of the plurality of rake functional nodes and further capable of responding to second configuration information to configure for a searcher functional mode of the plurality of rake functional modes; and the multimode processor is capable of responding to the first configuration information to configure for the multipath reception functional mode and further capable of responding to second configuration information to configure for the searcher functional mode.

46. The apparatus of claim 45, wherein when the apparatus is in an acquisition mode, all adaptive multimode rake fingers of the plurality of adaptive multimode rake fingers are configured for the searcher functional mode and the multimode processor is configured for the searcher functional mode.

47. The apparatus of claim 45, wherein when the apparatus is in a traffic mode:

a first subset of adaptive multimode rake fingers of the plurality of adaptive multimode rake fingers are configured for the searcher functional mode and a first portion of the multimode processor is configured for the searcher functional mode; and a second subset of adaptive multimode rake fingers of the plurality of adaptive multimode rake fingers are configured for the multipath reception functional mode and a second portion of the multimode processor is configured for the multipath reception functional mode.

48. The apparatus of claim 47, wherein the first subset of adaptive multimode rake fingers configured for the searcher functional mode and the second subset of adaptive multimode rake fingers configured for the multipath reception functional mode are dynamically determined based upon at least one channel dependent parameter selected from a plurality of channel-dependent parameters, the plurality of channel-dependent parameters comprising a pilot signal relative power level, a number of identified multipaths, a number of identified base stations, received traffic signal-to-noise ratio, and received traffic error rate.

49. The apparatus of claim 45, wherein when the apparatus is in an idle mode:
- a first subset of adaptive multimode rake fingers of the plurality of adaptive multimode rake fingers and a first portion of the multimode processor are configured for the searcher functional mode;
- a second subset of adaptive multimode rake fingers of the plurality of adaptive multimode rake fingers and a second portion of the multimode processor are configured for the path reception functional mode; and
- a third subset of adaptive multimode rake fingers of the plurality of adaptive multimode rake fingers and a third portion of the multimode processor are configured for comparatively lower power consumption.

50. A multimode rake receiver, comprising:
- a network interface;
- a plurality of adaptive multimode rake fingers coupled to the network interface, each adaptive multimode rake finger of the plurality of adaptive multimode rake fingers comprising a plurality of heterogeneous computational elements capable of responding to a first mode signal to configure for a first functional mode for path reception, further capable of responding to a second mode signal to configure for a second functional mode for searching, and further capable of responding to a third mode signal to configure for a third, non-rake functional mode;
- a multimode processor operably coupled to the plurality of adaptive multimode rake fingers, the multimode processor comprising a plurality of heterogeneous computational elements capable of responding to the first mode signal to configure for the first functional mode for path reception; further capable of responding to the second mode signal to configure for the second functional mode for searching; and further capable of responding to the third mode signal to configure for the third, non-rake functional mode;
- wherein when the multimode rake receiver is in an acquisition mode, all adaptive multimode rake fingers of the plurality of adaptive multimode rake fingers are configured for the second functional mode for searching and the multimode processor is configured for the second functional mode for searching;
- wherein when the multimode rake receiver is in a traffic mode, a first subset of adaptive multimode rake fingers of the plurality of adaptive multimode rake fingers and a first portion of the multimode processor are configured for the second functional mode for searching; and a second subset of adaptive multimode rake fingers of the plurality of adaptive multimode rake fingers and a second portion of the multimode processor are configured for the first functional mode for path reception;
- wherein the first subset of adaptive multimode rake fingers configured for the second functional mode for searching and the second subset of adaptive multimode rake fingers configured for the first functional mode for path reception are dynamically determined based upon at least one channel-dependent parameter selected from a plurality of channel-dependent parameters, the plurality of channel-dependent parameters further comprising a pilot signal relative power level, a number of identified multipaths, a number of identified base stations, received traffic signal-to-noise ratio, and received traffic error rate.

* * * * *

UNITED STATES PATENT AND TRADEMARK OFFICE
CERTIFICATE OF CORRECTION

PATENT NO. : 6,618,434 B2  
DATED : September 9, 2003  
INVENTOR(S) : Ghobad Heidari-Bateni and Robert Thomas Plunkett It is certified that error appears in the above-identified patent and that said Letters Patent is hereby corrected as shown below:

<u>Title page,</u>
Item "[\*] Notice: Subject to any disclaimer, the term of this patent is extended or adjusted under 35 U.S.C. 154(b) by 0 days" please change to read:
-- [\*] Notice: Subject to any disclaimer, the term of this patent is extended or adjusted under 35 U.S.C. 154(b) by 203 days --

Signed and Sealed this

Second Day of December, 2003

JAMES E. ROGAN
*Director of the United States Patent and Trademark Office*